(12) United States Patent
Pan et al.

(10) Patent No.: US 10,928,542 B2
(45) Date of Patent: Feb. 23, 2021

(54) METHOD OF DETERMINING FULL GREEN'S TENSOR WITH RESISTIVITY MEASUREMENT

(71) Applicant: Halliburton Energy Services, Inc., Houston, TX (US)

(72) Inventors: Li Pan, Singapore (SG); Hsu-Hsiang Wu, Sugarland, TX (US); Yijing Fan, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 26 days.

(21) Appl. No.: 16/479,353

(22) PCT Filed: Jun. 7, 2018

(86) PCT No.: PCT/US2018/036492
§ 371 (c)(1),
(2) Date: Jul. 19, 2019

(87) PCT Pub. No.: WO2019/236090
PCT Pub. Date: Dec. 12, 2019

(65) Prior Publication Data
US 2020/0309984 A1   Oct. 1, 2020

(51) Int. Cl.
*G01V 3/28* (2006.01)
*E21B 49/00* (2006.01)

(52) U.S. Cl.
CPC ................ *G01V 3/28* (2013.01); *E21B 49/00* (2013.01)

(58) Field of Classification Search
CPC .................................. G01V 3/28; E21B 49/00
See application file for complete search history.

(56) References Cited

U.S. PATENT DOCUMENTS

| 7,545,145 B2 | 6/2009 | Wang |
| 7,756,641 B2 | 7/2010 | Donadille et al. |

(Continued)

FOREIGN PATENT DOCUMENTS

| GB | 2409723 | 7/2005 |
| WO | 2013086270 | 6/2013 |

OTHER PUBLICATIONS

ISRWO International Search Report and Written Opinion for PCT/US2018/036492 dated Mar. 7, 2019.
(Continued)

*Primary Examiner* — Manuel A Rivera Vargas
*Assistant Examiner* — Yaritza H Perez Bermudez
(74) *Attorney, Agent, or Firm* — Benjamin Ford; C. Tumey Law Group PLLC

(57) ABSTRACT

A method may comprise: inserting into a wellbore penetrating a subterranean formation an apparatus comprising: a transmitter sub comprising a transmitter coil; a first receiver sub comprising a first receiver coil; a second receiver sub comprising a second receiver coil; and a third receiver sub comprising a third receiver coil; generating an electromagnetic wave at the transmitter coil; propagating the electromagnetic wave through the subterranean formation; receiving the electromagnetic wave in the first receiver coil, the second receiver coil, and the third receiver coil; generating a plurality of response signals, wherein the plurality of response signals comprises a first response signal in the first receiver coil, a second response signal in the second receiver coil, and a third response signal the third receiver coil; solving a series of linear equations defined by an orientation of the transmitter sub in the wellbore, orientation in the wellbore for each of the first receiver coil, the second receiver coil, and the third receiver coil, and the plurality of response signals to determine a Green's response tensor.

17 Claims, 4 Drawing Sheets

(56) References Cited

U.S. PATENT DOCUMENTS

| | | | |
|---|---|---|---|
| 7,987,074 B2 | 7/2011 | Carazzone et al. | |
| 8,274,289 B2 | 9/2012 | Bittar et al. | |
| 2008/0215243 A1* | 9/2008 | Rabinovich | G01V 3/28 702/7 |
| 2010/0188089 A1* | 7/2010 | Kuzmin | G01V 3/165 324/330 |
| 2010/0277177 A1 | 11/2010 | Alumbaugh et al. | |
| 2011/0140701 A1* | 6/2011 | Legendre | G01V 3/28 324/339 |
| 2012/0026314 A1* | 2/2012 | Zhdanov | G01V 3/26 348/85 |
| 2015/0185344 A1 | 7/2015 | Bardainne | |
| 2016/0002977 A1 | 1/2016 | Wu et al. | |
| 2016/0116616 A1 | 4/2016 | Yu et al. | |
| 2016/0187525 A1* | 6/2016 | Wilson | G01V 99/005 702/6 |
| 2017/0096887 A1* | 4/2017 | Wilson | G06F 17/11 |
| 2017/0261637 A1* | 9/2017 | Wilson | G01V 3/26 |
| 2020/0018149 A1* | 1/2020 | Luo | G01H 9/004 |

OTHER PUBLICATIONS

Zhda nov et al., "Fast 3D Imaging from a Single Borehole Using Tensor Induction Logging Data", Petrophysics, 2004.

\* cited by examiner

METHOD OF DETERMINING FULL GREEN'S TENSOR WITH RESISTIVITY MEASUREMENT

BACKGROUND

Modern petroleum drilling and production operations may demand a great quantity of information relating to the parameters and conditions downhole. Such information typically includes the location and orientation of the borehole and drilling assembly, earth formation properties, and parameters of the downhole drilling environment. The collection of information relating to formation properties and downhole conditions is commonly referred to as "logging", and can be performed during the drilling process itself (hence the term "logging while drilling" or "LWD," frequently used interchangeably with the term "measurement while drilling" or "MWD").

Various measurement tools exist for use in LWD. One such tool is the resistivity tool, which includes one or more antennas for transmitting an electromagnetic signal into the formation and one or more antennas for receiving a formation response. Physical phenomena that determine how the measurement is made may vary with frequency, for example. In some examples, the amplitude and/or the phase of the receive signals are compared to the amplitude and/or phase of the transmit signals to measure the formation resistivity. In other cases, the amplitude and/or phase of multiple receive signals are compared to each other to measure the formation resistivity.

When plotted as a function of depth or tool position in the borehole, the logging tool measurements are termed "logs." Resistivity logging may be used in well logging to determine geological correlation of formation strata and detect and quantify potentially productive formation zones. Such logs may provide indications of hydrocarbon concentrations and other information useful to drillers and completion engineers. In particular, azimuthally-sensitive logs may provide information useful for steering the drilling assembly because they can inform the driller when a target formation bed has been entered or exited, thereby enabling modifications to the drilling program that will provide much more value and higher success than would be the case using only seismic data.

Generally, in real formations, a resistivity of the formation varies in different directions, for example, a formation resistivity may vary in the x, y, and z coordinates. Previous methods of determining a formation resistivity may have assumed a uniaxial vertical 1-dimensional (V-1D) structure where resistivity is assumed to be constant on an x-y plane, for example, with resistivity only varying in the z direction. In some uncomplicated formations, an assumption of V1-D may be appropriate as the assumption of V1-D may closely match the true formation resistivity. However, in complicated formations with real resistivity varying in three directions, the assumption of V-1D may not produce an accurate enough picture of formation resistivity. Using an assumption of V-1D may result in an incomplete picture of formation resistivity and thereby a sub-optimal drilling path may be followed. As a consequence, a full Green's Tensor for resistivity in complicated formations may not be able to be calculated using the assumption of V-1D.

BRIEF DESCRIPTION OF THE DRAWINGS

A better understanding of the various disclosed embodiments may be obtained when the following detailed description is considered in conjunction with the attached drawings, in which.

It should be understood that the drawings and corresponding detailed description do not limit the disclosure, but on the contrary, they provide the foundation for understanding all is modifications, equivalents, and alternatives falling within the scope of the appended claims.

DETAILED DESCRIPTION

This disclosure may generally relate to apparatuses, systems and methods for producing deep formation evaluations using logging while drilling ("LWD") tools with multiple subs. In other examples, this disclosure may relate to apparatuses, systems and methods for producing deep formation evaluations using wireline logging having multiple subs.

The resistivity of a given formation may be isotropic (equal in all directions) or anisotropic (unequal in different directions). In electrically anisotropic formations, the anisotropy is generally attributable to extremely fine layering during the sedimentary buildup of the formation. As a result, in a formation Cartesian coordinate system oriented such that the x-y plane is parallel to the formation layers and the z axis is perpendicular to the formation layers, resistivities Rx and Ry in the x and y directions, respectively, may tend to be similar, but resistivity Rz in the z direction may tend to be different. The resistivity in a direction parallel to the formation plane (i.e., the x-y plane) may be referred to as the horizontal resistivity, Rh, and the resistivity in the direction perpendicular to the plane of the formation (i.e., the z direction) may be referred to the vertical resistivity, Rv. The index of anisotropy, η, is defined as $rI=[Rv/Rh]^{1/2}$.

As previously discussed, a complex formation may have resistivity that is directionally dependent in three dimension. Such a formation may be referred to as anisotropic. A resistivity of a formation may also be described as isotropic or uniaxial. For a formation that is isotropic, Equation 1 may describe the resistivity. An isotropic formation may have no variation in resistivity with orientation in the formation. Equation 2 may describe a uniaxial formation where the resistivity does not vary in the x-y plane but varies with z. Although illustrated in the x-y plane in Equation 2, the plane may also be x-z or y-z. As previously discussed, an assumption that a formation behaves in a uniaxial manner may be referred to as V1-D. Equation 3 illustrates the case of an anisotropic formation resistivity where the resistivity is directionally dependent in three dimensions.

$$F(x,y,z)=[f(x,y,z)] \quad (1)$$

$$F(x,y,z)=[f\_xy(x,y,z),f\_z(x,y,z,)] \quad (2)$$

$$F(x,y,z)=[f\_x(x,y,z),f\_y(x,y,z),f\_z(x,y,z)] \quad (3)$$

Figure 1:
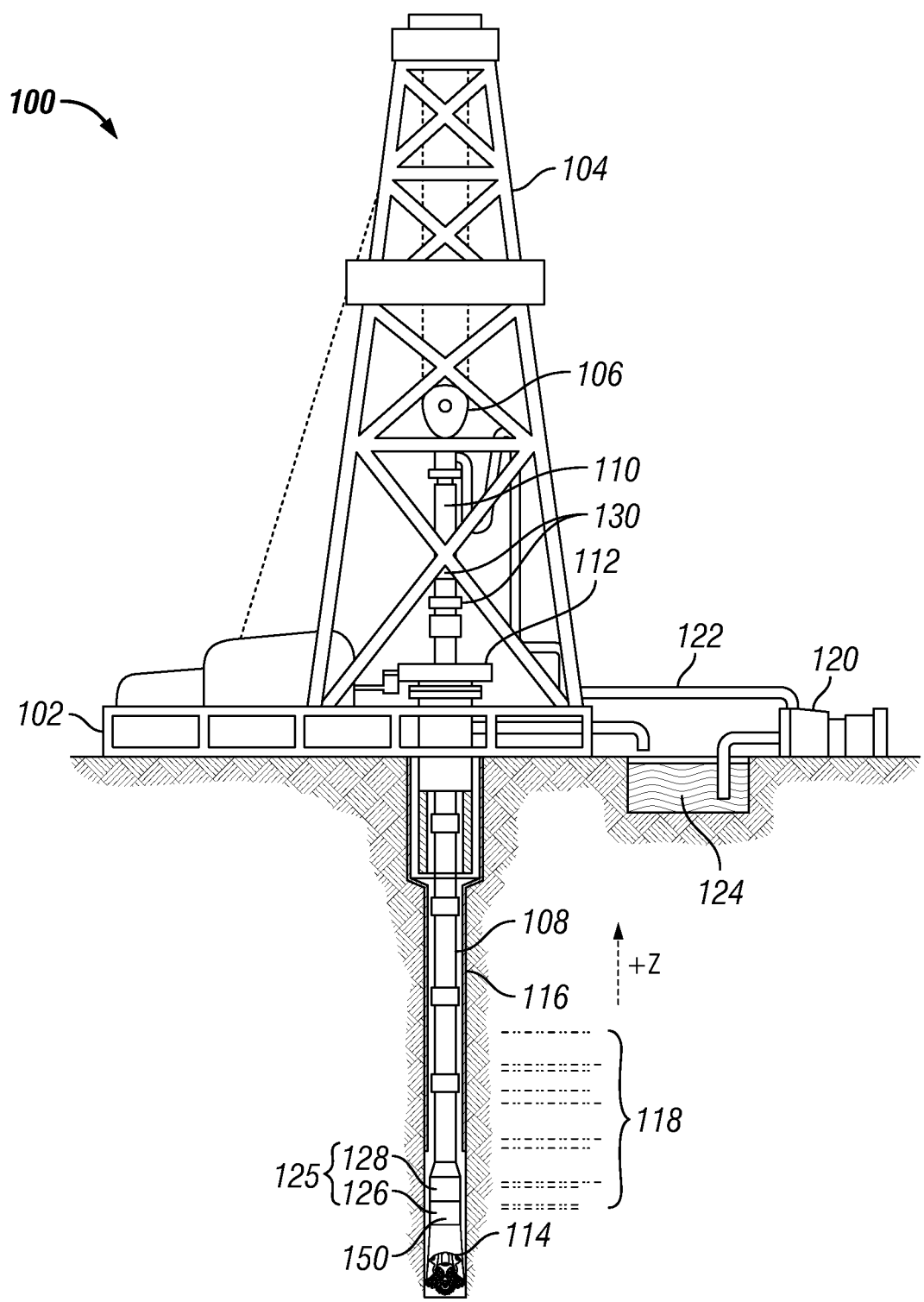
FIG. 1 shows an illustrative logging while drilling (LWD) environment.

The disclosed apparatuses, systems and methods may be best understood in the context of the larger systems in which they operate. FIG. 1 illustrates a diagrammatic view of an exemplary logging while drilling (LWD) and/or measurement while drilling (MWD) wellbore operating environment 100 in which the present disclosure may be implemented. As depicted in FIG. 1, a drilling platform 102 is equipped with a derrick 104 that supports a hoist 106 for raising and lowering a drill string 108. The hoist 106 suspends a top drive 110 suitable for rotating the drill string 108 and lowering the drill string 108 through the well head 112. Connected to the lower end of the drill string 108 is a drill bit 114. As the drill bit 114 rotates, the drill bit 114 creates a wellbore 116 that passes through various formations 118. A pump 120 circulates drilling fluid through a supply pipe 122 to top drive 110, down through the interior of drill string 108, through orifices in drill bit 114, back to the surface via the annulus around drill string 108, and into a retention pit 124. The drilling fluid transports cuttings from the wellbore 116 into the pit 124 and aids in maintaining the integrity of the wellbore 116. Various materials can be used for drilling fluid, including oil-based fluids and water-based fluids.

As depicted in FIG. 1, logging tools 126 are integrated into the bottom-hole assembly 125 near the drill bit 114. As the drill bit 114 extends the wellbore 116 through the formations 118, logging tools 126 collect measurements relating to various formation properties as well as the orientation of the tool and various other drilling conditions. The bottom-hole assembly 125 may also include a telemetry sub 128 to transfer measurement data to a surface receiver 130 and to receive commands from the surface. In some embodiments, the telemetry sub 128 communicates with a surface receiver 130 using mud pulse telemetry. In other cases, the telemetry sub 128 does not communicate with the surface, but rather stores logging data for later retrieval at the surface when the logging assembly is recovered. Notably, one or more of the bottom-hole assembly 125, the logging tools 126, and the telemetry sub 128 may also operate using a non-conductive cable (e.g. slickline, etc.) with a local power supply, such as batteries and the like. When employing non-conductive cable, communication may be supported using, for example, wireless protocols (e.g. EM, acoustic, etc.) and/or measurements and logging data may be stored in local memory for subsequent retrieval at the surface, as is appreciated by those skilled in the art.

Each of the logging tools 126 may include a plurality of tool components, spaced apart from each other, and communicatively coupled with one or more wires. Logging tools 126 may include tools such as the one shown in FIG. 4 in order to perform resistivity, or conductivity logging. The telemetry sub 128 may include wireless telemetry or logging capabilities, or both, such as to transmit or later provide information indicative of received energy/waveforms to operators on the surface or for later access and data processing for the evaluation of formation 118 properties.

The logging tools 126, including the resistivity logging tool, may also include one or more computing device 150 communicatively coupled with one or more of the plurality of tool components. Computing device 150 may comprise components such as processors, memory, input/output devices, interfaces, and the like. The computing device 150 may be configured to control or monitor the performance of the tools 126, process logging data, and/or carry out the methods of the present disclosure.

In some embodiments, one or more of the logging tools 126 may communicate with a surface receiver 130, such as a wired drillpipe. In other cases, the one or more of the logging tools 126 may communicate with a surface receiver 130 by wireless signal transmission. In at least some cases, one or more of the logging tools 126 may receive electrical power from a wire that extends to the surface, including wires extending through a wired drillpipe. In at least some instances the methods and techniques of the present disclosure may be performed by a computing device (not shown) on the surface. In some embodiments, the computing device may be included in surface receiver 130. For example, surface receiver 130 of wellbore operating environment 100 at the surface may include one or more of wireless telemetry, processor circuitry, or memory facilities, such as to support substantially real-time processing of data received from one or more of the logging tools 126. In some embodiments, data is processed at some time subsequent to its collection, wherein the data may be stored on the surface at surface receiver 130, stored downhole in telemetry sub 128, or both, until it is retrieved for processing.

Figure 2:
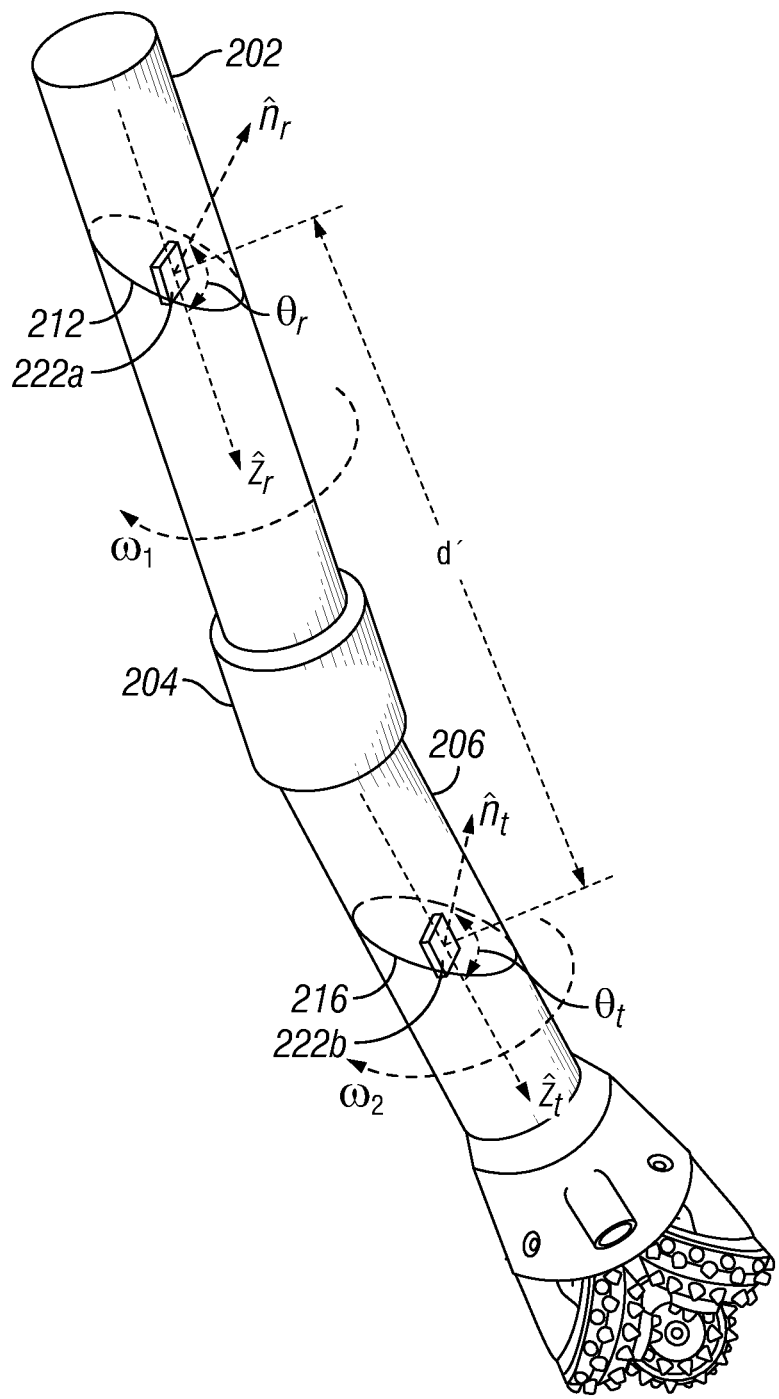
FIG. 2 shows an illustrative drillstring with two logging tool modules.

FIG. 2 shows an illustrative example of a deep formation evaluation logging tool that includes two LWD tool modules 202 and 206 at different locations and orientations along a drillstring. In the example shown, a resistivity logging tool receive antenna 212 and a corresponding receive antenna position measurement device 222a may be housed within LWD tool module 202, while a resistivity logging tool transmit antenna 216 and a corresponding transmit antenna position measurement device 222b (components of an "at bit" instrument) are housed within LWD tool module 206. The position measurement devices may locate the position of each corresponding antenna, which may be expressed, for example, in terms of each antenna's tilt angle ($\theta_r$ and $\theta_T$ relative to the $z_r$ and $z_t$ axes respectively; generally fixed and known), each antenna's azimuthal angle ($\alpha_r$ and $\alpha_t$ relative to the x axis), each LWD tool module's inclination angle ($\varphi_r$ and $\varphi_t$) and the distance d' between the antennas.

As a further complication to measuring formation resistivity, boreholes are generally perpendicular to formation beds. The angle between the axis of the well bore and the orientation of the formation beds (as represented by the normal vector) has two components. These components are the dip angle and the azimuth angle. The dip angle is the angle between the borehole axis and the normal vector for the formation bed. The azimuth angle is the direction in which the borehole's axis "leans away from" the normal vector. Electromagnetic resistivity logging measurements are a complex function of formation resistivity, formation anisotropy, and the formation dip and azimuth angles, which may all be unknown. A triaxial induction well logging tool may be used to detect formation properties such as resistivity anisotropy, which is one of the important parameters in evaluation subterranean formations such as sand-shale reservoirs or fractured reservoirs. However, the resistivity anisotropy parameter cannot be obtained without performing a numerical inversion process. Specifically, numerical inversion may be required to obtain accurate formation resistivity anisotropy parameters. The log inversion required for anisotropy determination may involve a large number of inversion parameters to be determined by an algorithm referred to as the ID vertical inversion. Generally, this algorithm may require large amounts of processing time and be sensitive to noise from logging, the logging environment characteristics and borehole correction, which could result in errors in the inverted vertical resistivity.

Figure 3:
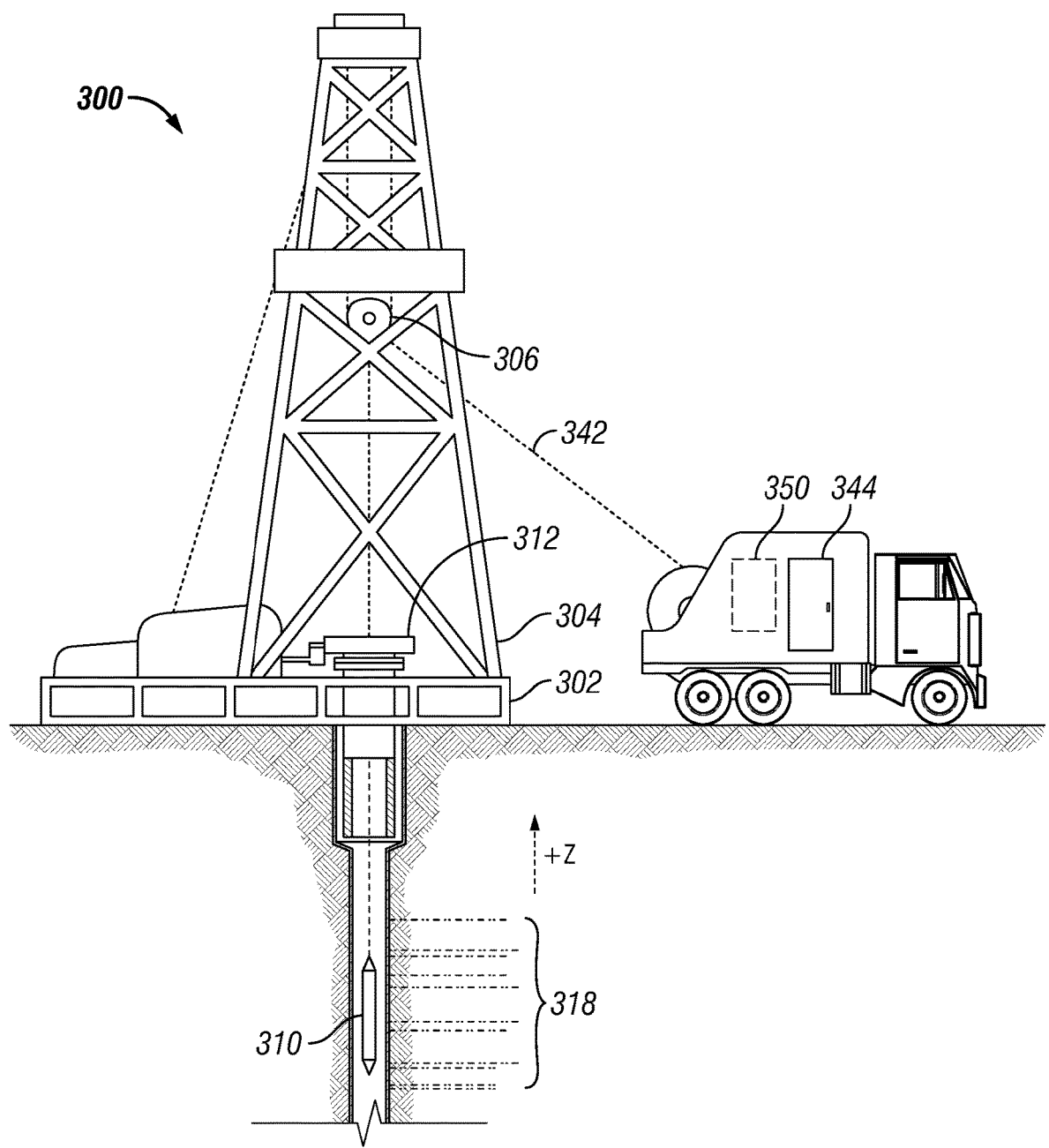
FIG. 3 shows an illustrative logging tool and a surface system.

FIG. 3 illustrates a diagrammatic view of a conveyance logging wellbore operating environment 300 in which the present disclosure may be implemented. As depicted in FIG. 3, a hoist 306 may be included as a portion of a platform 302, such as that coupled to derrick 304, and used with a conveyance 342 to raise or lower equipment such as resistivity logging tool 310 into or out of a borehole. Resistivity logging tool 310 may include, for example, tools such as the one shown in FIG. 4. A conveyance 342 may provide a communicative coupling between the resistivity logging tool 310 and a logging facility 344 at the surface. The conveyance 342 may include wires (one or more wires), slicklines, cables, or the like, as well as tubular conveyances such as coiled tubing, joint tubing, or other tubulars, and may include a downhole tractor. Additionally, power can be supplied via the conveyance 342 to meet power requirements of the tool. The resistivity logging tool 310 may have a local power supply, such as batteries, downhole generator and the like. When employing non-conductive cable, coiled tubing, pipe string, or downhole tractor, communication may be supported using, for example, wireless protocols (e.g. EM, acoustic, etc.), and/or measurements and logging data may be stored in local memory for subsequent retrieval. The logging facility 344 may include a computing device 350 capable of carrying out the methods and techniques of the present disclosure. In this manner, information about the formation 318 may be obtained by resistivity logging tool 310 and processed by a computing device, such as computing device 350. In some embodiments, computing device 350 is equipped to process the received information in substantially real-time, while in some embodiments, computing device 350 can be equipped to store the received information for processing at some subsequent time.

Figure 4:
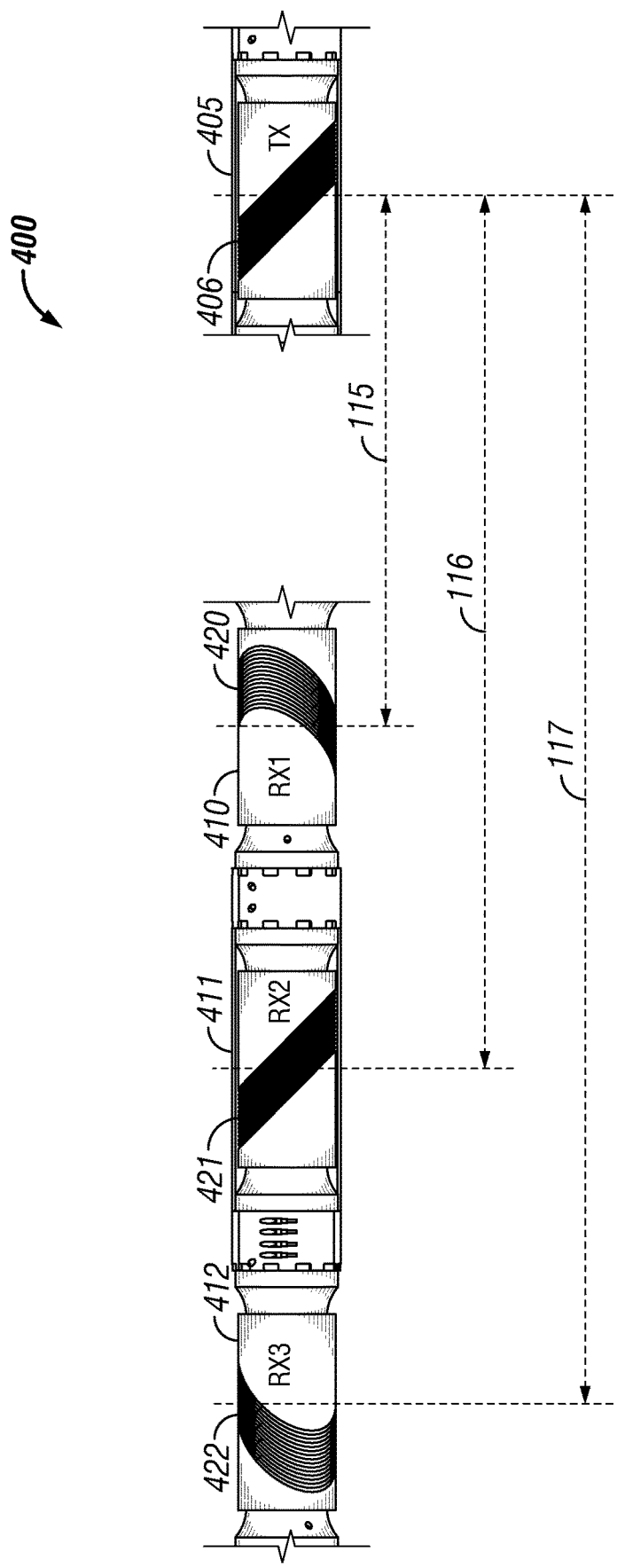
FIG. 4 shows an illustrative logging tool.

FIG. 4 illustrates an example wellbore tool 400 that may be used in the systems and methods described herein. Wellbore tool 400 may comprise transmitter sub 405 and one or more receiver subs 410, 411, and 412. In some examples, transmitter sub 405 may be referred to as TX and receiver subs 410, 411, and 412 may be referred to as RX1, RX2, and RX3 respectively. Transmitter sub 405 may comprise a transmitter coil 406 which may be an electromagnetic wave source such as a monopole, dipole, quadrupole, or other higher order wave source. Each of the receiver subs 410, 411, and 412 may comprise three or more receiver coils per sub configured to receive an electromagnetic wave from transmitter sub 405. Receiver subs 410, 411, and 412 may be disposed on wellbore tool 400 a distance 115, 116, 117 from transmitter sub 105. Distance 115, 116, 117 may also be referred to as S1, S2, and S3 respectively.

As illustrated in FIG. 4, first receiver coils 420 are not co-axial with receiver sub 410. There may be an axial offset between first receiver coils 420 and a centerline of receiver sub 410 which may be notated as $\theta_{R1}$. Similarly, for transmitter coil 406, second receiver coils 421, and third receiver coils 422, there may be an axial offset of coils from a centerline of the respective subs notated as $\theta_T$, $\theta_{R2}$, and $\theta_{R3}$ respectively. In addition to axial offset, each of the first receiver coils 420, second receiver coils 421, and third receiver coils 422 may have an azimuthal offset relative to transmitter coil 406.

Table 1 illustrates the notations for wellbore tool 400 of FIG. 1. The tilt angle of the transmitter coil is notated as $\theta_T$ and the tilt angle, or azimuthal offset, of each of the receiver coils is notated as $\theta_{R1}$, $\theta_{R2}$, and $\theta_{R3}$ for RX1, RX2, and RX3 respectively. The azimuth angle is dependent on the tool's rotated position in the wellbore. $\beta_{off}$ is the difference in azimuthal angle between the transmitter coil and the second receiver coil which can be measured before the tool is inserted into the wellbore. $\beta_{\Delta 1}$ is the difference in azimuthal angle between the first receiver coil and the second receiver coil and $\beta_{\Delta 2}$ the difference in azimuthal angle between the third receiver coil and second receiver coil. $\beta_{\Delta 1}$ and $\beta_{\Delta 2}$ can take any value, but must meeting the following requirements: (1) $\beta_{\Delta 1} \neq \beta_{\Delta 2}$, (2) $\beta_{\Delta 1} \neq 0°$, and (3) $\beta_{\Delta 2} \neq 0°$.

As will be further illustrated below, a system of linear equations may be generated from the wellbore tool's measurements in the wellbore. In Table 1, m represents the total number of measurements per turn of the wellbore tool and n represents the current measurement number. For example, a wellbore tool may take m=32 measurements per turn and n would count 1 through 32. If m is 32, a system of 32 linear equations may be generated.

TABLE 1

| Antenna # | Tilt Angle | Azimuth Angle | Distance From TX | Measured Response |
|---|---|---|---|---|
| TX | $\theta_T$ | $\beta_T = \frac{n}{m} \cdot 360°$ $(n = 1, 2, \ldots, m)$ | 0 | N.A. |
| RX1 | $\theta_{R1}$ | $\beta_{R1} = \beta_T + \beta_{off} + \beta_{\Delta 1}$ | $S_1$ | $V_1(\theta_T, \beta_T, \theta_{R1}, \beta_{R1})$ |
| RX2 | $\theta_{R2}$ | $\beta_{R2} = \beta_T + \beta_{off}$ | $S_2$ | $V_2(\theta_T, \beta_T, \theta_{R2}, \beta_{R2})$ |
| RX3 | $\theta_{R3}$ | $\beta_{R3} = \beta_T + \beta_{off} + \beta_{\Delta 2}$ | $S_3$ | $V_3(\theta_T, \beta_T, \theta_{R3}, \beta_{R3})$ |

FIG. 3 illustrates a multicomponent tool which can provide measurements $V_1$, $V_2$, and $V_3$. The measurements may be used to derive Green's response tensor illustrated in Equation 4. The elements of the Green's response tensor represent the impedance response signal received from each RX on the tool. Each element has two subscripts. The first subscript denotes the component of TX and the second subscript denotes the component of RX. For example, $Z_{xy}$ means the response signal of an RX (receiver coil) oriented in Y coordinate direction caused by signal from TX oriented in X direction. The X, Y, and Z directions are defined by the tool coordinate system wherein the coordinate system origin is at the center of TX and the Z direction aligns with the direction from the center of RX2 (the middle RX) to the center of TX. The X direction is perpendicular to Z direction and parallel to layer boundary and the Y direction is perpendicular to both X and Z direction.

$$\begin{bmatrix} Z_{xx} & Z_{xy} & Z_{xz} \\ Z_{yx} & Z_{yy} & Z_{yz} \\ Z_{zx} & Z_{zy} & Z_{zz} \end{bmatrix} \tag{4}$$

As previously discussed, an assumption of uniaxial vertical-1D formation structure has been used to simplify resistivity measurements. Equation 5 illustrates that a V1-D assumption will reduce the Greens response tensor to 5 non-zero components. In real formations with anisotropic resistivity each component of the Green's response tensor is needed to accurately report resistivity in each direction.

$$\begin{bmatrix} Z_{xx} & 0 & Z_{xz} \\ 0 & Z_{yy} & 0 \\ Z_{zx} & 0 & Z_{zz} \end{bmatrix} \tag{5}$$

A general formula for a response signal of an RX is illustrated in Equation 6 and the expanded formula is illustrated in equation 7.

$$V = (\theta_T, \beta_T, \theta_R, \beta_R) = \tag{6}$$
$$[\sin\theta_T\cos\beta_T \; \sin\theta_T\sin\beta_T \; \cos\theta_T] \begin{bmatrix} Z_{xx} & Z_{xy} & Z_{xz} \\ Z_{yx} & Z_{yy} & Z_{yz} \\ Z_{zx} & Z_{zy} & Z_{zz} \end{bmatrix} \begin{bmatrix} \sin\theta_R\cos\beta_R \\ \sin\theta_R\sin\beta_R \\ \cos\theta_R \end{bmatrix}$$

$$= \sin\theta_T\cos\beta_T\sin\theta_R\cos\beta_R \cdot Z_{xx} + \sin\theta_T\cos\beta_T\sin\theta_R\sin\beta_R \cdot Z_{xy} + \tag{7}$$
$$\sin\theta_T\cos\beta_T\cos\beta_R \cdot Z_{xz} + \sin\theta_T\sin\beta_T\sin\theta_R\cos\beta_R \cdot Z_{yx} +$$
$$\sin\theta_T\sin\beta_T\sin\theta_R\sin\beta_R \cdot Z_{yy} + \sin\theta_T\sin\beta_T\cos\beta_R \cdot Z_{yz} +$$
$$\cos\theta_T\sin\theta_R\cos\beta_R \cdot Z_{zx} + \cos\theta_T\sin\theta_R\sin\beta_R \cdot Z_{zy} + \cos\theta_T\cos\beta_R \cdot Z_{zz}$$

In Equation 6, the first vector [sin $\theta_T$ cos $\beta_T$ sin $\theta_T$ sin $\beta_T$ cos $\theta_T$] corresponds to the orientation of the transmitter and the second vector $$\begin{bmatrix} \sin\theta_R\cos\beta_R \\ \sin\theta_R\sin\beta_R \\ \cos\theta_R \end{bmatrix}$$

corresponds to the orientation of the receiver. Equation 6 may be applied to each receiver using the formulas from Table 1. The general response signal for RX1, RX2 and RX3 are displayed below in equations 8, 9, and 10 respectively.

$V_1(\theta_T,\beta_T,\theta_{R1},\beta_{R1})$=sin $\theta_T$ cos $\beta_T$ sin $\theta_{R1}$ cos $\beta_{R1} \cdot Z_{xx}^{R1}$+sin $\theta_T$ cos $\beta_T$ sin $\theta_{R1}$ sin $\beta_{R1} \cdot Z_{xy}^{R1}$+sin $\theta_T$ cos $\beta_T$ cos $\beta_{R1} \cdot Z_{xz}^{R1}$+sin $\theta_T$ sin $\beta_T$ sin $\theta_{R1}$ cos $\beta_{R1} \cdot Z_{yx}^{R1}$+sin $\theta_T$ sin $\beta_T$ sin $\theta_{R1}$ sin $\beta_{R1} \cdot Z_{yy}^{R1}$+sin $\theta_T$ sin $\beta_T$ cos $\beta_{R1} \cdot Z_{yz}^{R1}$+cos $\theta_T$ sin $\theta_{R1}$ cos $\beta_{R1} \cdot Z_{zx}^{R1}$+cos $\theta_T$ sin $\theta_{R1}$ sin $\beta_{R1} \cdot Z_{zy}^{R1}$+cos $\theta_T$ cos $\beta_{R1} \cdot Z_{zz}^{R1}$ (8)

$V_2(\theta_T,\beta_T,\theta_{R2},\beta_{R2})$=sin $\theta_T$ cos $\beta_T$ sin $\theta_{R2}$ cos $\beta_{R2} \cdot Z_{xx}^{R2}$+sin $\theta_T$ cos $\beta_T$ sin $\theta_{R2}$ sin $\beta_{R2} \cdot Z_{xy}^{R2}$+sin $\theta_T$ cos $\beta_T$ cos $\beta_{R2} \cdot Z_{xz}^{R2}$+sin $\theta_T$ sin $\beta_T$ sin $\theta_{R2}$ cos $\beta_{R1} \cdot Z_{yx}^{R2}$+sin $\theta_T$ sin $\beta_T$ sin $\beta_{R2} \cdot Z_{yy}^{R22}$+sin $\theta_T$ sin $\beta_T$ cos $\beta_{R2} \cdot Z_{yz}^{R2}$+cos $\theta_T$ sin $\theta_{R2}$ cos $\beta_{R2} \cdot Z_{zx}^{R2}$+cos $\theta_T$ sin $\theta_{R2}$ sin $\beta_{R2} \cdot Z_{zy}^{R2}$+cos $\theta_T$ cos $\beta_{R2} \cdot Z_{zz}^{R2}$ (9)

$V_3(\theta_T,\beta_T,\theta_{R3},\beta_{R1})$=sin $\theta_T$ cos $\beta_T$ sin $\theta_{R3}$ cos $\beta_{R3} \cdot Z_{xx}^{R3}$+sin $\theta_T$ cos $\beta_T$ sin $\theta_{R3}$ sin $\beta_{R3} \cdot Z_{xy}^{R3}$+sin $\theta_T$ cos $\beta_T$ cos $\beta_{R3} \cdot Z_{xz}^{R3}$+sin $\theta_T$ sin $\beta_T$ sin $\theta_{R3}$ cos $\beta_{R3} \cdot Z_{yx}^{R3}$+sin $\theta_T$ sin $\beta_T$ sin $\theta_{R3}$ sin $\beta_{R3} \cdot Z_{yy}^{R3}$+sin $\theta_T$ sin $\beta_T$ cos $\beta_{R3} \cdot Z_{yz}^{R3}$+cos $\theta_T$ sin $\theta_{R3}$ cos $\beta_{R3} \cdot Z_{zx}^{R3}$+cos $\theta_T$ sin $\theta_{R3}$ sin $\beta_{R3} \cdot Z_{zy}^{R3}$+cos $\theta_T$ cos $\beta_{R3} \cdot Z_{zz}^{R3}$ (10)

By solving equations 8-9, the Green's response tensor may be obtained. In some examples, certain parameters may be already known based on preprocessing of survey information. For example, $\theta_T$, $\theta_{R1}$, $\theta_{R2}$, $\theta_{R3}$, $\beta_T$, $\beta_{R1}$, $\beta_{R2}$, $\beta_{R3}$ may be known based on tool characterizations. Furthermore, an assumption may be made regarding the relative spacing of each of the receiver subs relative to the transmitter sub. Since the distance between each RX is small compared to each TX-RX spacing, each spacing may be assumed to be $Z\_{}^{R1} \approx Z\_{}^{R2} \approx Z\_{}^{R3}$. Additionally, $\beta_{off}$ off may be measured on the wellbore tool. The assumptions are applied to Equations 8-10 to transform the equations to Equations 11-13.

$$V_1(n) = \sin\theta_T\cos\beta_T\sin\theta_{R1}\cos\left(\frac{n}{m}\cdot 360° + \beta_{off} + \beta_{\Delta 1}\right)\cdot Z_{xx}^{R2} + \quad (11)$$
$$\sin\theta_T\cos\beta_T\sin\theta_{R1}\sin\left(\frac{n}{m}\cdot 360° + \beta_{off} + \beta_{\Delta 1}\right)\cdot Z_{xy}^{R2} +$$
$$\sin\theta_T\cos\beta_T\cos\left(\frac{n}{m}\cdot 360° + \beta_{off} + \beta_{\Delta 1}\right)\cdot Z_{xz}^{R2} +$$
$$\sin\theta_T\sin\beta_T\sin\theta_{R1}\cos\left(\frac{n}{m}\cdot 360° + \beta_{off} + \beta_{\Delta 1}\right)\cdot Z_{yx}^{R2} +$$
$$\sin\theta_T\sin\beta_T\sin\theta_{R1}\sin\beta_{R1}\cdot Z_{yy}^{R2} +$$
$$\sin\theta_T\sin\beta_T\cos\left(\frac{n}{m}\cdot 360° + \beta_{off} + \beta_{\Delta 1}\right)\cdot Z_{yz}^{R2} +$$
$$\cos\theta_T\sin\theta_{R1}\cos\left(\frac{n}{m}\cdot 360° + \beta_{off} + \beta_{\Delta 1}\right)\cdot Z_{zx}^{R2} +$$
$$\cos\theta_T\sin\theta_{R1}\sin\left(\frac{n}{m}\cdot 360° + \beta_{off} + \beta_{\Delta 1}\right)\cdot Z_{zy}^{R2} +$$
$$\cos\theta_T\cos\left(\frac{n}{m}\cdot 360° + \beta_{off} + \beta_{\Delta 1}\right)\cdot Z_{zz}^{R2}$$

-continued
$$V_2(n) = \sin\theta_T\cos\beta_T\sin\theta_{R2}\cos\left(\frac{n}{m}\cdot 360° + \beta_{off}\right)\cdot Z_{xx}^{R2} + \quad (12)$$
$$\sin\theta_T\cos\beta_T\sin\theta_{R2}\sin\left(\frac{n}{m}\cdot 360° + \beta_{off}\right)\cdot Z_{xy}^{R2} +$$
$$\sin\theta_T\cos\beta_T\cos\left(\frac{n}{m}\cdot 360° + \beta_{off}\right)\cdot Z_{xz}^{R2} +$$
$$\sin\theta_T\sin\beta_T\sin\theta_{R2}\cos\left(\frac{n}{m}\cdot 360° + \beta_{off}\right)\cdot Z_{yx}^{R2} +$$
$$\sin\theta_T\sin\beta_T\sin\theta_{R1}\sin\left(\frac{n}{m}\cdot 360° + \beta_{off}\right)\cdot Z_{yy}^{R22} +$$
$$\sin\theta_T\sin\beta_T\cos\left(\frac{n}{m}\cdot 360° + \beta_{off}\right)\cdot Z_{yz}^{R2} + \cos\theta_T\sin\theta_{R2}\cos\beta_{R2}\cdot Z_{zx}^{R2} +$$
$$\cos\theta_T\sin\theta_{R2}\sin\left(\frac{n}{m}\cdot 360° + \beta_{off}\right)\cdot Z_{zy}^{R2} +$$
$$\cos\theta_T\cos\left(\frac{n}{m}\cdot 360° + \beta_{off}\right)\cdot Z_{zz}^{R2}$$

$$V_3(n) = \sin\theta_T\cos\beta_T\sin\theta_{R3}\cos\left(\frac{n}{m}\cdot 360° + \beta_{off} + \beta_{\Delta 2}\right)\cdot Z_{xx}^{R2} + \quad (13)$$
$$\sin\theta_T\cos\beta_T\sin\theta_{R3}\sin\left(\frac{n}{m}\cdot 360° + \beta_{off} + \beta_{\Delta 2}\right)\cdot Z_{xy}^{R2} +$$
$$\sin\theta_T\cos\beta_T\cos\left(\frac{n}{m}\cdot 360° + \beta_{off} + \beta_{\Delta 2}\right)\cdot Z_{xz}^{R2} +$$
$$\sin\theta_T\sin\beta_T\sin\theta_{R3}\cos\left(\frac{n}{m}\cdot 360° + \beta_{off} + \beta_{\Delta 2}\right)\cdot Z_{yx}^{R2} +$$
$$\sin\theta_T\sin\beta_T\sin\theta_{R3}\sin\left(\frac{n}{m}\cdot 360° + \beta_{off} + \beta_{\Delta 2}\right)\cdot Z_{yy}^{R2} +$$
$$\sin\theta_T\sin\beta_T\cos\left(\frac{n}{m}\cdot 360° + \beta_{off} + \beta_{\Delta 2}\right)\cdot Z_{yz}^{R2} +$$
$$\cos\theta_T\sin\theta_{R3}\cos\left(\frac{n}{m}\cdot 360° + \beta_{off} + \beta_{\Delta 2}\right)\cdot Z_{zx}^{R2} +$$
$$\cos\theta_T\sin\theta_{R3}\sin\left(\frac{n}{m}\cdot 360° + \beta_{off} + \beta_{\Delta 2}\right)\cdot Z_{zy}^{R2} +$$
$$\cos\theta_T\cos\left(\frac{n}{m}\cdot 360° + \beta_{off} + \beta_{\Delta 2}\right)\cdot Z_{zz}^{R2}$$

For each of Equations 11-13, n ranges from 1 to m with m corresponding to the number of measurements per turn. As previously discussed, the number of measurements can be any arbitrary number. Equations 11-13 can be combined into a linear system where each component of the m-by-9 matrix $\bar{B}_{m\times 9}$ may be determined by the coefficients of Equations 11-13. The linear system is illustrated in Equation 14.

$$\begin{bmatrix} V_1(n=1) \\ V_2(n=1) \\ V_3(n=1) \\ \vdots \\ V_1(n=m) \\ V_2(n=m) \\ V_3(n=m) \end{bmatrix} = \bar{\bar{B}}_{m\times 9} \cdot \begin{bmatrix} Z_{xx}^{R2} \\ Z_{xy}^{R2} \\ Z_{xz}^{R2} \\ Z_{yx}^{R2} \\ Z_{yy}^{R2} \\ Z_{yz}^{R2} \\ Z_{zx}^{R2} \\ Z_{zy}^{R2} \\ Z_{zz}^{R2} \end{bmatrix} \quad (14)$$

The linear system of Equation 14 is an over-determined linear equation. However, the rank matrix $\bar{B}$ is 9 so the system may be solved by least square matrix inversion illustrated in Equation 14 where H denotes Hermitian operator.

$$\begin{bmatrix} Z_{xx}^{R2} \\ Z_{xy}^{R2} \\ Z_{xz}^{R2} \\ Z_{yx}^{R2} \\ Z_{yy}^{R2} \\ Z_{yz}^{R2} \\ Z_{zx}^{R2} \\ Z_{zy}^{R2} \\ Z_{zz}^{R2} \end{bmatrix} = \left( \overline{\overline{B}}_{m \times 9}^{H} \cdot \overline{\overline{B}}_{m \times 9} \right)^{-1} \cdot \overline{\overline{B}}_{m \times 9}^{H} \cdot \begin{bmatrix} V_1(n=1) \\ V_2(n=1) \\ V_3(n=1) \\ \vdots \\ V_1(n=m) \\ V_2(n=m) \\ V_3(n=m) \end{bmatrix} \quad (15)$$

In some examples where the measurements are corrupted by noise, a Tikhonov regularization may be applied to the method. Equation 16 illustrates a Tikhonov regularization applied to Equation 15. The regularization factor λ may be determined by the L-curve method.

$$\begin{bmatrix} Z_{xx}^{R2} \\ Z_{xy}^{R2} \\ Z_{xz}^{R2} \\ Z_{yx}^{R2} \\ Z_{yy}^{R2} \\ Z_{yz}^{R2} \\ Z_{zx}^{R2} \\ Z_{zy}^{R2} \\ Z_{zz}^{R2} \end{bmatrix} = \left( \overline{\overline{B}}_{m \times 9}^{H} \cdot \overline{\overline{B}}_{m \times 9} + \lambda \overline{\overline{I}} \right)^{-1} \cdot \overline{\overline{B}}_{m \times 9}^{H} \cdot \begin{bmatrix} V_1(n=1) \\ V_2(n=1) \\ V_3(n=1) \\ \vdots \\ V_1(n=m) \\ V_2(n=m) \\ V_3(n=m) \end{bmatrix}$$

EXAMPLES

The methods presented herein were validated by numerical analysis with a signal-noise-ratio of 20 dB. The results of the test are displayed in Table 2.

TABLE 2

| Components | True Values | Test Results |
|---|---|---|
| Zxx | 0.3118 + 0.1039i | 0.3139 + 0.1046i |
| Zxy | 0.0054 − 0.0011i | 0.0054 − 0.0011i |
| Zxz | −0.2009 + 0.0502i | −0.2025 + 0.0506i |
| Zyx | −0.1385 − 0.1172i | −0.1390 − 0.1176i |
| Zyy | 0.0003 + 0.0015i | 0.0003 + 0.0015i |
| Zyz | 0.2019 − 0.0505i | 0.2035 − 0.0509i |
| Zzx | 0.1322 − 0.1119i | 0.1335 − 0.1129i |
| Zzy | −0.0051 − 0.0010i | −0.0052 − 0.0010i |
| Zzz | −0.1299 − 0.0162i | −0.1301 − 0.0163i |

Discussed above are methods and systems for improving current technology. Specifically, improving the quality of electrical images that may be used to determine formation properties. Current problems faced by imaging tools reduce and degrade electrical images. Poor quality electrical images make drilling operations and/or production operations difficult. Operators may make improper decisions based off low quality images. This may extend drilling time, increase costs, reduce production, and/or negatively affect a well. There is a need to produce high quality electrical images that are reliable.

In wellbore imaging operations, certain assumptions may be made about the formation's resistivity trends in 3-D space. These assumptions, referred to as V1-D, may produce inaccurate representations of formation resistivity. As disclosed above, a method which does not make the assumption of V1-D will improve wellbore resistivity images. Specifically, the methods and system may eliminate effects that cause inaccuracies in the imaging data, thereby increasing accuracy of the electrical images.

Accordingly, this disclosure describes apparatus and methods that may relate to subterranean operations. The apparatus, methods, and compositions may further be characterized by one or more of the following statements:

Statement 1. A method comprising:
inserting into a wellbore penetrating a subterranean formation an apparatus comprising:
a transmitter sub comprising a transmitter coil;
a first receiver sub comprising a first receiver coil;
a second receiver sub comprising a second receiver coil; and
a third receiver sub comprising a third receiver coil;
generating an electromagnetic wave at the transmitter coil;
propagating the electromagnetic wave through the subterranean formation;
receiving the electromagnetic wave in the first receiver coil, the second receiver coil, and the third receiver coil;
generating a plurality of response signals, wherein the plurality of response signals comprises a first response signal in the first receiver coil, a second response signal in the second receiver coil, and a third response signal the third receiver coil;
solving a series of linear equations defined by an orientation of the transmitter sub in the wellbore, orientation in the wellbore for each of the first receiver coil, the second receiver coil, and the third receiver coil, and the plurality of response signals to determine a Green's response tensor.

Statement 2. The method of statement 1 wherein the series of linear equations have the following form for each of the response signals:

$$V(\theta_T, \beta_T, \theta_R, \beta_R) = [\sin\theta_T \cos\beta_T \; \sin\theta_T\sin\beta_T \; \cos\theta_T] \begin{bmatrix} Z_{xx} & Z_{xy} & Z_{xz} \\ Z_{yx} & Z_{yy} & Z_{yz} \\ Z_{zx} & Z_{zy} & Z_{zz} \end{bmatrix} \begin{bmatrix} \sin\theta_R\cos\beta_R \\ \sin\theta_R\sin\beta_R \\ \cos\theta_R \end{bmatrix}$$

where $V(\theta_T, \beta_T, \theta_R, \beta_R)$ is the response signal for receiver coil i, $\theta_T$ is a tilt angle of the transmitter coil, $\beta_T$ is an azimuth angle of the transmitter coil, $\theta_R$ is a tilt angle of the receiver coil i, $\beta_R$ is an azimuth angle of the receiver coil i, $Z_{xx}$ is a component of the response signal for receiver coil i oriented in an X direction caused by the transmitter coil in the X direction, $Z_{xy}$ is a component of the response signal for receiver coil i oriented in a Y direction caused by the transmitter coil in the X direction, $Z_{xz}$ is a component of the response signal for receiver coil i oriented in an Z direction caused by the transmitter coil in the X direction, $Z_{yx}$ is a component of the response signal for receiver coil i oriented in the X direction caused by the transmitter coil in the Y direction, $Z_{yy}$ is a component of the response signal for receiver coil i oriented in the Y direction caused by the transmitter coil in the Y direction, $Z_{yz}$ is a component of the response signal for receiver coil i oriented in the Z direction caused by the transmitter coil in the Y direction, $Z_{zx}$ is a component of the response signal for receiver coil i oriented in the X direction caused by the transmitter coil in the Z direction, $Z_{zy}$ i is a component of the response signal for receiver coil i oriented in Y direction caused by the transmitter coil in the Z direction, $Z_{zz}$ is a component of the response signal for receiver coil i oriented in the Z direction caused by the transmitter coil in the Z direction, $\theta_R$ is a tilt angle of the receiver coil i, and $\beta_R$ is an azimuth angle of the receiver coil i, wherein receiver coil i is one of the first receiver coil, the second receiver coil, or the third receiver coil.

Statement 3. The method of any preceding statement wherein the series of linear equations has the following form for the response signal corresponding to each receiver coil; for the first receiver coil:
$V_1(\theta_T,\beta_T,\theta_{R1},\beta_{R1})=\sin\theta_T\cos\beta_T\sin\theta_{R1}\cos\beta_{R1}\cdot Z_{xx}^{R1}+\sin\theta_T\cos\beta_T\sin\theta_{R1}\sin\beta_{R1}\cdot Z_{xy}^{R1}+\sin\theta_T\cos\beta_T\cos\beta_{R1}\cdot Z_{xz}^{R1}+\sin\theta_T\sin\beta_T\sin\theta_{R1}\cos\beta_{R1}\cdot Z_{yx}^{R1}+\sin\theta_T\sin\beta_T\sin\theta_{R1}\sin\beta_{R1}\cdot Z_{yy}^{R1}+\sin\theta_T\sin\beta_T\cos\beta_{R1}\cdot Z_{yz}^{R1}+\cos\theta_T\sin\theta_{R1}\cos\beta_{R1}\cdot Z_{zx}^{R1}+\cos\theta_T\sin\theta_{R1}\sin\beta_{R1}\cdot Z_{zy}^{R1}+\cos\theta_T\cos\beta_{R1}\cdot Z_{zz}^{R1}$
where $V_1(\theta_T,\beta_T,\theta_{R1},\beta_{R1})$ is the response signal of the first receiver coil, $\theta_T$ is a tilt angle of the transmitter coil, $\beta_T$ is an azimuth angle of the transmitter coil, $Z_{xx}^{R1}$ is a component of the first response signal oriented in an X direction caused by the transmitter coil in the X direction, $Z_{xy}^{R1}$ is a component of the first response signal oriented in a Y direction caused by the transmitter coil in the X direction, $Z_{xz}^{R1}$ is a component of the first response signal oriented in a Z direction caused by the transmitter coil in the X direction, $Z_{yx}^{R1}$ is a component of the first response signal oriented in the X direction caused by the transmitter coil in the Y direction, $Z_{yy}^{R1}$ is a component of the first response signal oriented in the Y direction caused by the transmitter coil in the Y direction, $Z_{yz}^{R1}$ is a component of the first response signal oriented in the Z direction caused by the transmitter coil in the Y direction, $Z_{zx}^{R1}$ is a component of the first response signal oriented in the X direction caused by the transmitter coil in the Z direction, $Z_{zy}^{R1}$ is a component of the first response signal oriented in the Y direction caused by the transmitter coil in the Z direction, $Z_{zz}^{R1}$ is a component of the first response signal oriented in the Z direction caused by the transmitter coil in the Z direction, $\theta_{R1}$ is a tilt angle of the first receiver coil, and $\beta_{R1}$ is an azimuth angle of the first receiver coil;
for the second receiver coil:
$V_2(\theta_T,\beta_T,\theta_{R2},\beta_{R2})=\sin\theta_T\cos\beta_T\sin\theta_{R2}\cos\beta_{R2}\cdot Z_{xx}^{R2}+\sin\theta_T\cos\beta_T\sin\theta_{R2}\sin\beta_{R2}\cdot Z_{xy}^{R2}+\sin\theta_T\cos\beta_T\cos\beta_{R2}\cdot Z_{xz}^{R2}+\sin\theta_T\sin\beta_T\sin\theta_{R2}\cos\beta_{R2}\cdot Z_{yx}^{R2}+\sin\theta_T\sin\beta_T\sin\theta_{R1}\sin\beta_{R2}\cdot Z_{yy}^{R22}+\sin\theta_T\sin\beta_T\cos\beta_{R2}\cdot Z_{yz}^{R2}+\cos\theta_T\sin\theta_{R2}\cos\beta_{R2}\cdot Z_{zx}^{R2}+\cos\theta_T\sin\theta_{R2}\sin\beta_{R2}\cdot Z_{zy}^{R2}+\cos\theta_T\cos\beta_{R2}\cdot Z_{zz}^{R2}$
where $V_2(\theta_T,\beta_T,\theta_{R2},\beta_{R2})$ is the response signal of the second receiver coil, $\theta_T$ is the tilt angle of the transmitter coil, $\beta_T$ is the azimuth angle of the transmitter coil, $Z_{xx}^{R2}$ is a component of the second response signal oriented in the X direction caused by the transmitter coil in the X direction, $Z_{xy}^{R2}$ is a component of the second response signal oriented in the Y direction caused by the transmitter coil in the X direction, $Z_{xz}^{R2}$ is a component of the second response signal oriented in the X direction, $Z_{yx}^{R2}$ is a component of the second response signal oriented in the Y direction, $Z_{yy}^{R2}$ is a component of the second response signal oriented in the Y direction caused by the transmitter coil in the Y direction, $Z_{yz}^{R2}$ is a component of the second response signal oriented in the Z direction caused by the transmitter coil in the Y direction, $Z_{zx}^{R2}$ is a component of the second response signal oriented in the X direction caused by the transmitter coil in the Z direction, $Z_{zy}^{R2}$ is a component of the second response signal oriented in the Y direction caused by the transmitter coil in the Z direction, $Z_{zz}^{R2}$ is a component of the second response signal oriented in the Z direction caused by the transmitter coil in the Z direction, $\theta_{R2}$ is a tilt angle of the second receiver coil, and $\beta_{R2}$ is an azimuth angle of the second receiver coil;

for the third receiver coil:
$V_3(\theta_T,\beta_T,\theta_{R3},\beta_{R1})=\sin\theta_T\cos\beta_T\sin\theta_{R3}\cos\beta_{R3}\cdot Z_{xx}^{R3}+\sin\theta_T\cos\beta_T\sin\theta_{R3}\sin\beta_{R3}\cdot Z_{xy}^{R3}+\sin\theta_T\cos\beta_T\cos\beta_{R3}\cdot Z_{xz}^{R3}+\sin\theta_T\sin\beta_T\sin\theta_{R3}\cos\beta_{R3}\cdot Z_{yx}^{R3}+\sin\theta_T\sin\beta_T\sin\theta_{R3}\sin\beta_{R3}\cdot Z_{yy}^{R3}+\sin\theta_T\sin\beta_T\cos\beta_{R3}\cdot Z_{yz}^{R3}+\cos\theta_T\sin\theta_{R3}\cos\beta_{R3}\cdot Z_{zx}^{R3}+\cos\theta_T\sin\theta_{R3}\sin\beta_{R3}\cdot Z_{zy}^{R3}+\cos\theta_T\cos\beta_{R3}\cdot Z_{zz}^{R3}$
where $V_3(\theta_T,\beta_T,\theta_{R3},\beta_{R3})$ is the response signal of the third receiver coil, $\theta_T$ is the tilt angle of the transmitter coil, $\beta_T$ is the azimuth angle of the transmitter coil, $Z_{xx}^{R3}$ is a component of the third response signal oriented in the X direction caused by the transmitter coil in the X direction, $Z_{xy}^{R3}$ is a component of the third response signal oriented in the Y direction caused by the transmitter coil in the X direction, $Z_{xz}^{R3}$ is a component of the third response signal oriented in the Z direction caused by the transmitter coil in the X direction, $Z_{yx}^{R3}$ is a component of the third response signal oriented in the X direction caused by the transmitter coil in the Y direction, $Z_{yy}^{R3}$ is a component of the third response signal oriented in the Y direction caused by the transmitter coil in the Y direction, $Z_{yz}^{R3}$ is a component of the third response signal oriented in the Z direction caused by the transmitter coil in the Y direction, $Z_{zx}^{R3}$ is a component of the third response signal oriented in the X direction caused by the transmitter coil in the Z direction, $Z_{zx}^{R3}$ i is a component of the third response signal oriented in the Y direction caused by the transmitter coil in the Z direction, $Z_{zz}^{R3}$ is a component of the third response signal oriented in the Z direction caused by the transmitter coil in the Z direction, $\theta_{R3}$ is a tilt angle of the third receiver coil, and $\beta_R$ is an azimuth angle of the third receiver coil.

Statement 4. The method of any preceding statement wherein each azimuth angle is found by the following equations:
azimuth angle of the transmitter coil:

$$\beta_T = \frac{n}{m} \cdot 360°$$

where $\beta_T$ is the azimuth angle of the transmitter coil, m is a number of times the first receiver coil samples per turn of the apparatus in the wellbore, and n is an index from 1 to m;
azimuth angle of the first receiver coil:

$$\beta_{R1}=\beta_T+\beta_{off}+\beta_{\Delta 1}$$

where $\beta_{R1}$ is the azimuth angle of the first receiver coil, $\beta_{off}$ is the difference in azimuthal angle between the transmitter coil and the second receiver coil, $\beta_{\Delta 1}$ is the difference in azimuthal angle between the first receiver coil and the second receiver coil,
azimuth angle of the second receiver coil:

$$\beta_{R2}=\beta_T+\beta_{off}$$

where $\beta_{R2}$ is the azimuth angle of the second receiver coil, azimuth angle of the third receiver coil:

$\beta_{R3} = \beta_T + \beta_{off} + \beta_{\Delta 2}$ where $\beta_{R2}$ is the azimuth angle of the second receiver coil and $\beta_{\Delta 2}$ the difference in azimuthal angle between the second receiver coil and third receiver coil.

Statement 5. The method of any preceding statement wherein an assumption of $\underline{\underline{Z}}^{R1} \approx \underline{\underline{Z}}^{R2} \approx \underline{\underline{Z}}^{R3}$ is applied to each response signal equation such that:

$$V_1(n) = \sin\theta_T \cos\beta_T \sin\theta_{R1} \cos\left(\frac{n}{m} \cdot 360° + \beta_{off} + \beta_{\Delta 1}\right) \cdot Z_{xx}^{R2} +$$
$$\sin\theta_T \cos\beta_T \sin\theta_{R1} \sin\left(\frac{n}{m} \cdot 360° + \beta_{off} + \beta_{\Delta 1}\right) \cdot Z_{xy}^{R2} +$$
$$\sin\theta_T \cos\beta_T \cos\left(\frac{n}{m} \cdot 360° + \beta_{off} + \beta_{\Delta 1}\right) \cdot Z_{xz}^{R2} +$$
$$\sin\theta_T \sin\beta_T \sin\theta_{R1} \cos\left(\frac{n}{m} \cdot 360° + \beta_{off} + \beta_{\Delta 1}\right) \cdot Z_{yx}^{R2} +$$
$$\sin\theta_T \sin\beta_T \sin\theta_{R1} \sin\beta_{R1} \cdot Z_{yy}^{R2} +$$
$$\sin\theta_T \sin\beta_T \cos\left(\frac{n}{m} \cdot 360° + \beta_{off} + \beta_{\Delta 1}\right) \cdot Z_{yz}^{R2} +$$
$$\cos\theta_T \sin\theta_{R1} \cos\left(\frac{n}{m} \cdot 360° + \beta_{off} + \beta_{\Delta 1}\right) \cdot Z_{zx}^{R2} +$$
$$\cos\theta_T \sin\theta_{R1} \sin\left(\frac{n}{m} \cdot 360° + \beta_{off} + \beta_{\Delta 1}\right) \cdot Z_{zy}^{R2} +$$
$$\cos\theta_T \cos\left(\frac{n}{m} \cdot 360° + \beta_{off} + \beta_{\Delta 1}\right) \cdot Z_{zz}^{R2}$$

$$V_2(n) = \sin\theta_T \cos\beta_T \sin\theta_{R2} \cos\left(\frac{n}{m} \cdot 360° + \beta_{off}\right) \cdot Z_{xx}^{R2} +$$
$$\sin\theta_T \cos\beta_T \sin\theta_{R2} \sin\left(\frac{n}{m} \cdot 360° + \beta_{off}\right) \cdot Z_{xy}^{R2} +$$
$$\sin\theta_T \cos\beta_T \cos\left(\frac{n}{m} \cdot 360° + \beta_{off}\right) \cdot Z_{xz}^{R2} +$$
$$\sin\theta_T \sin\beta_T \sin\theta_{R2} \cos\left(\frac{n}{m} \cdot 360° + \beta_{off}\right) \cdot Z_{yx}^{R2} +$$
$$\sin\theta_T \sin\beta_T \sin\theta_{R1} \sin\left(\frac{n}{m} \cdot 360° + \beta_{off}\right) \cdot Z_{yy}^{R22} +$$
$$\sin\theta_T \sin\beta_T \cos\left(\frac{n}{m} \cdot 360° + \beta_{off}\right) \cdot Z_{yz}^{R2} + \cos\theta_T \sin\theta_{R2} \cos\beta_{R2} \cdot Z_{zx}^{R2} +$$
$$\cos\theta_T \sin\theta_{R2} \sin\left(\frac{n}{m} \cdot 360° + \beta_{off}\right) \cdot Z_{zy}^{R2} + \cos\theta_T \cos\left(\frac{n}{m} \cdot 360° + \beta_{off}\right) \cdot Z_{zz}^{R2}$$

$$V_3(n) = \sin\theta_T \cos\beta_T \sin\theta_{R3} \cos\left(\frac{n}{m} \cdot 360° + \beta_{off} + \beta_{\Delta 2}\right) \cdot Z_{xx}^{R2} +$$
$$\sin\theta_T \cos\beta_T \sin\theta_{R3} \sin\left(\frac{n}{m} \cdot 360° + \beta_{off} + \beta_{\Delta 2}\right) \cdot Z_{xy}^{R2} +$$
$$\sin\theta_T \cos\beta_T \cos\left(\frac{n}{m} \cdot 360° + \beta_{off} + \beta_{\Delta 2}\right) \cdot Z_{xz}^{R2} +$$
$$\sin\theta_T \sin\beta_T \sin\theta_{R3} \cos\left(\frac{n}{m} \cdot 360° + \beta_{off} + \beta_{\Delta 2}\right) \cdot Z_{yx}^{R2} +$$
$$\sin\theta_T \sin\beta_T \sin\theta_{R3} \sin\left(\frac{n}{m} \cdot 360° + \beta_{off} + \beta_{\Delta 2}\right) \cdot Z_{yy}^{R2} +$$
$$\sin\theta_T \sin\beta_T \cos\left(\frac{n}{m} \cdot 360° + \beta_{off} + \beta_{\Delta 2}\right) \cdot Z_{yz}^{R2} +$$
$$\cos\theta_T \sin\theta_{R3} \cos\left(\frac{n}{m} \cdot 360° + \beta_{off} + \beta_{\Delta 2}\right) \cdot Z_{zx}^{R2} +$$
$$\cos\theta_T \sin\theta_{R3} \sin\left(\frac{n}{m} \cdot 360° + \beta_{off} + \beta_{\Delta 2}\right) \cdot Z_{zy}^{R2} +$$
$$\cos\theta_T \cos\left(\frac{n}{m} \cdot 360° + \beta_{off} + \beta_{\Delta 2}\right) \cdot Z_{zz}^{R2}$$

where $V_1(n)$ is the first response signal with respect to index n, $V_2(n)$ is the second response signal with respect to index n, and $V_3(n)$ is the third response signal with respect to index n.

Statement 6. The method of any preceding statement wherein each of the response signals with respect to n is:

$$\begin{bmatrix} V_1(n=1) \\ V_2(n=1) \\ V_3(n=1) \\ \vdots \\ V_1(n=m) \\ V_2(n=m) \\ V_3(n=m) \end{bmatrix} = \overline{\overline{B}}_{m \times 9} \cdot \begin{bmatrix} Z_{xx}^{R2} \\ Z_{xy}^{R2} \\ Z_{xz}^{R2} \\ Z_{yx}^{R2} \\ Z_{yy}^{R2} \\ Z_{yz}^{R2} \\ Z_{zx}^{R2} \\ Z_{zy}^{R2} \\ Z_{zz}^{R2} \end{bmatrix}$$

where $\overline{\overline{B}}_{m \times 9}$ is an m by 9 matrix comprising coefficients from each of the response signals with respect to n for the first response signal, the second response signal, and the third response signal from n to m.

Statement 7. The method of any previous statement wherein the step solving the series of linear equations comprises solving for a vector defined as:

$$\begin{bmatrix} Z_{xx}^{R2} \\ Z_{xy}^{R2} \\ Z_{xz}^{R2} \\ Z_{yx}^{R2} \\ Z_{yy}^{R2} \\ Z_{yz}^{R2} \\ Z_{zx}^{R2} \\ Z_{zy}^{R2} \\ Z_{zz}^{R2} \end{bmatrix}.$$

Statement 8. The method of any previous statement wherein the vector is solved for using least square matrix inversion using a Hermitian operator such that:

$$\begin{bmatrix} Z_{xx}^{R2} \\ Z_{xy}^{R2} \\ Z_{xz}^{R2} \\ Z_{yx}^{R2} \\ Z_{yy}^{R2} \\ Z_{yz}^{R2} \\ Z_{zx}^{R2} \\ Z_{zy}^{R2} \\ Z_{zz}^{R2} \end{bmatrix} = \left(\overline{\overline{B}}_{m \times 9}^{H} \cdot \overline{\overline{B}}_{m \times 9}\right)^{-1} \cdot \overline{\overline{B}}_{m \times 9}^{H} \cdot \begin{bmatrix} V_1(n=1) \\ V_2(n=1) \\ V_3(n=1) \\ \vdots \\ V_1(n=m) \\ V_2(n=m) \\ V_3(n=m) \end{bmatrix}$$

where H is the Hermitian operator.

Statement 9. The method of any previous statement wherein the vector is solved for using least square matrix inversion using a Hermitian operator and Tikhonov regularization is applied such that:

$$\begin{bmatrix} Z_{xx}^{R2} \\ Z_{xy}^{R2} \\ Z_{xz}^{R2} \\ Z_{yx}^{R2} \\ Z_{yy}^{R2} \\ Z_{yz}^{R2} \\ Z_{zx}^{R2} \\ Z_{zy}^{R2} \\ Z_{zz}^{R2} \end{bmatrix} = \left(\overline{\overline{B}}_{m\times 9}^{H} \cdot \overline{\overline{B}}_{m\times 9} + \lambda \overline{\overline{I}}\right)^{-1} \cdot \overline{\overline{B}}_{m\times 9}^{H} \cdot \begin{bmatrix} V_1(n=1) \\ V_2(n=1) \\ V_3(n=1) \\ \vdots \\ V_1(n=m) \\ V_2(n=m) \\ V_3(n=m) \end{bmatrix}$$

where $\lambda$ is a regularization factor.

Statement 10. The method of any previous statement wherein $\lambda$ is determined by an L-curve method.

Statement 11. An apparatus comprising:
a wellbore drill bit;
a transmitter sub comprising a transmitter coil;
a first receiver sub comprising a first receiver coil;
a second receiver sub comprising a second receiver coil; and
a third receiver sub comprising a third receiver coil;
wherein the transmitter sub is configured to generate an electromagnetic wave at the transmitter coil and propagate the electromagnetic wave through a subterranean formation, wherein the first receiver coil is configured to receive the electromagnetic wave and generate a first response signal, wherein the second receiver coil is configured to receive the electromagnetic wave and generate a second response signal, and wherein the third receiver coil is configured to receive the electromagnetic wave and generate a third response signal;
at least one processor; and
a memory coupled to the processor to provide software that configures the processor to solve a series of linear equations defined by an orientation of the transmitter sub in the wellbore, an orientation of the first receiver coil, an orientation of the second receiver coil, and an orientation the third receiver coil, and each of the first response signal, the second response signal, and the third response signal to determine a Green's response tensor.

Statement 12. The apparatus of statement 11 wherein the series of linear equations has the following form for a response signal corresponding to each receiver, the response signal being the first response signal, the second response signal, or the third response signal;

for the first receiver:
$V_1(\theta_T,\beta_T,\theta_{R1},\beta_{R1}) = \sin\theta_T \cos\beta_T \sin\theta_{R1} \cos\beta_{R1} \cdot Z_{xx}^{R1} + \sin\theta_T \cos\beta_T \sin\theta_{R1} \sin\beta_{R1} \cdot Z_{xy}^{R1} + \sin\theta_T \cos\beta_T \cos\beta_{R1} \cdot Z_{xz}^{R1} + \sin\theta_T \sin\beta_T \sin\theta_{R1} \cos\beta_{R1} \cdot Z_{yx}^{R1} + \sin\theta_T \sin\beta_T \sin\theta_{R1} \sin\beta_{R1} \cdot Z_{yy}^{R1} + \sin\theta_T \sin\beta_T \cos\beta_{R1} \cdot Z_{yz}^{R1} + \cos\theta_T \sin\theta_{R1} \cos\beta_{R1} \cdot Z_{zx}^{R1} + \cos\theta_T \sin\theta_{R1} \sin\beta_{R1} \cdot Z_{zy}^{R1} + \cos\theta_T \cos\beta_{R1} \cdot Z_{zz}^{R1}$
where $V_1(\theta_T,\beta_T,\theta_{R1},\beta_{R1})$ is the first response signal, $\theta_T$ is a tilt angle of the transmitter coil, $\beta_T$ is an azimuth angle of the transmitter coil, $Z_{xx}^{R1}$ a component of the first response signal oriented in an X direction caused by the transmitter coil in the X direction, $Z_{xy}^{R1}$ a component of the first response signal oriented in a Y direction caused by the transmitter coil in the X direction, $Z_{xz}^{R1}$ a component of the first response signal oriented in a Z direction caused by the transmitter coil in the X direction, $Z_{yx}^{R1}$ a component of the first response signal oriented in the X direction caused by the transmitter coil in the Y direction, $Z_{yy}^{R1}$ a component of the first response signal oriented in the Y direction caused by the transmitter coil in the Y direction, $Z_{yz}^{R1}$ i a component of the first response signal oriented in the Z direction caused by the transmitter coil in the Y direction, $Z_{zx}^{R1}$ a component of the first response signal oriented in the X direction caused by the transmitter coil in the Z direction, $Z_{zy}^{R1}$ a component of the first response signal oriented in the Y direction caused by the transmitter coil in the Z direction, $Z_{zz}^{R1}$ i a component of the first response signal oriented in the Z direction caused by the transmitter coil in the Z direction, $\theta_{R1}$ is a tilt angle of the first receiver coil, and $\beta_{R1}$ is an azimuth angle of the receiver coil;

for the second receiver coil:
$V_2(\theta_T,\beta_T,\theta_{R2},\beta_{R2}) = \sin\theta_T \cos\beta_T \sin\theta_{R2} \cos\beta_{R2} \cdot Z_{xx}^{R2} + \sin\theta_T \cos\beta_T \sin\theta_{R2} \sin\beta_{R2} \cdot Z_{xy}^{R2} + \sin\theta_T \cos\beta_T \cos\beta_{R2} \cdot Z_{xz}^{R2} + \sin\theta_T \sin\beta_T \sin\theta_{R2} \cos\beta_{R2} \cdot Z_{yx}^{R2} + \sin\theta_T \sin\beta_T \sin\theta_{R1} \sin\beta_{R2} \cdot Z_{yy}^{R22} + \sin\theta_T \sin\beta_T \cos\beta_{R2} \cdot Z_{yz}^{R2} + \cos\theta_T \sin\theta_{R2} \cos\beta_{R2} \cdot Z_{zx}^{R2} + \cos\theta_T \sin\theta_{R2} \sin\beta_{R2} \cdot Z_{zy}^{R2} + \cos\theta_T \cos\beta_{R2} \cdot Z_{zz}^{R2}$
where $V_2(\theta_T,\beta_T,\theta_{R2},\beta_{R2})$ is the second response signal, $\theta_T$ is the tilt angle of the transmitter coil, $\beta_T$ is the azimuth angle of the transmitter coil, $Z_{xx}^{R2}$ is a component of the second response signal oriented in the X direction caused by the transmitter coil in the X direction, $Z_{xy}^{R2}$ is a component of the second response signal oriented in the Y direction caused by the transmitter coil in the X direction, $Z_{xz}^{R2}$ is a component of the second response signal oriented in the Z direction caused by the transmitter coil in the X direction, $Z_{yx}^{R2}$ is a component of the second response signal oriented in the X direction caused by the transmitter coil in the Y direction, $Z_{yy}^{R2}$ is a component of the second response signal oriented in the Y direction caused by the transmitter coil in the Y direction, $Z_{yz}^{R2}$ is a component of the second response signal oriented in the Z direction caused by the transmitter coil in the Y direction, $Z_{zx}^{R2}$ is a component of the second response signal oriented in the X direction caused by the transmitter coil in the Z direction, $Z_{zx}^{R2}$ is a component of the second response signal oriented in the Y direction caused by the transmitter coil in the Z direction, $Z_{zz}^{R2}$ is a component of the second response signal oriented in the Z direction caused by the transmitter coil in the Z direction, $\theta_{R2}$ is a tilt angle of the second receiver coil, and $\beta_{R2}$ is an azimuth angle of the second receiver coil;

for the third receiver:
$V_3(\theta_T,\beta_T,\theta_{R3},\beta_{R1}) = \sin\theta_T \cos\beta_T \sin\theta_{R3} \cos\beta_{R3} \cdot Z_{xx}^{R3} + \sin\theta_T \cos\beta_T \sin\theta_{R3} \sin\beta_{R3} \cdot Z_{xy}^{R3} + \sin\theta_T \cos\beta_T \cos\beta_{R3} \cdot Z_{xz}^{R3} + \sin\theta_T \sin\beta_T \sin\theta_{R3} \cos\beta_{R3} \cdot Z_{yx}^{R3} + \sin\theta_T \sin\beta_T \sin\theta_{R3} \sin\beta_{R3} \cdot Z_{yy}^{R3} + \sin\theta_T \sin\beta_T \cos\beta_{R3} \cdot Z_{yz}^{R3} + \cos\theta_T \sin\theta_{R3} \cos\beta_{R3} \cdot Z_{zx}^{R3} + \cos\theta_T \sin\theta_{R3} \sin\beta_{R3} \cdot Z_{zy}^{R3} + \cos\theta_T \cos\beta_{R3} \cdot Z_{zz}^{R3}$
where $V_3(\theta_T,\beta_T,\theta_{R3},\beta_{R3})$ is the third response signal, $\theta_T$ is the tilt angle of the transmitter coil, $\beta_T$ is the azimuth angle of the transmitter coil, $Z_{xx}^{R3}$ is a component of the third response signal oriented in the X direction caused by the transmitter coil in the X direction, $Z_{xy}^{R3}$ is a component of the third response signal oriented in the Y direction caused by the transmitter coil in the X direction, $Z_{xz}^{R3}$ is a component of the third response signal oriented in the Z direction caused by the transmitter coil in the X direction, $Z_{yx}^{R3}$ is a component of the third response signal oriented in the X direction caused by the transmitter coil in the Y direction, $Z_{yy}^{R3}$ i is a component of the third response signal oriented in the Y direction caused by the transmitter coil in the Y direction, $Z_{yz}^{R3}$ is a component of the third response signal oriented in the Z direction caused by the transmitter coil in the Y direction, $Z_{zx}^{R3}$ is a component of the third response signal oriented in the X direction caused by the transmitter coil in the Z direction, $Z_{zx}^{R3}$ is a component of the third response signal oriented in the Y direction caused by the transmitter coil in the Z direction, $Z_{zz}^{R3}$ is a component of the third response signal oriented in the Z direction caused by the transmitter coil in the Z direction, $\theta_{R3}$ is a tilt angle of the receiver coil, and $\beta_{R3}$ is an azimuth angle of the third receiver coil.

Statement 13. The apparatus of any of statements 11-12 wherein each azimuth angle is found by the following equations:
azimuth angle of the transmitter coil:

$$\beta_T = \frac{n}{m} \cdot 360°$$

where $\beta_T$ is the azimuth angle of the transmitter coil, m is a number of times the first receiver coil samples per turn of the apparatus in the wellbore, and n is an index from 1 to m; azimuth angle of the first receiver coil:

$$\beta_{R1} = \beta_T + \beta_{off} + \beta_{\Delta 1}$$

where $\beta_{R1}$ is the azimuth angle of the first receiver coil, $\beta_{off}$ is the difference in azimuthal angle between the transmitter coil and the second receiver coil, $\beta_{\Delta 1}$ is the difference in azimuthal angle between the first receiver coil and the second receiver coil,
azimuth angle of the second receiver:

$$\beta_{R2} = \beta_T + \beta_{off}$$

where $\beta_{R2}$ is the azimuth angle of the second receiver coil, azimuth angle of the third receiver coil:

$$\beta_{R3} = \beta_T + \beta_{off} + \beta_{\Delta 2}$$

where $\beta_{R2}$ is the azimuth angle of the second receiver coil and $\beta_{\Delta 2}$ the difference in azimuthal angle between the second receiver coil and third receiver coil,
and wherein an assumption of $Z^{R1} \approx Z^{R2} \approx Z^{R3}$ is applied to each response signal equation such that:

$$V_1(n) = \sin\theta_T \cos\beta_T \sin\theta_{R1} \cos\left(\frac{n}{m} \cdot 360° + \beta_{off} + \beta_{\Delta 1}\right) \cdot Z_{xx}^{R2} +$$
$$\sin\theta_T \cos\beta_T \sin\theta_{R1} \sin\left(\frac{n}{m} \cdot 360° + \beta_{off} + \beta_{\Delta 1}\right) \cdot Z_{xy}^{R2} +$$
$$\sin\theta_T \cos\beta_T \cos\left(\frac{n}{m} \cdot 360° + \beta_{off} + \beta_{\Delta 1}\right) \cdot Z_{xz}^{R2} +$$
$$\sin\theta_T \sin\beta_T \sin\theta_{R1} \cos\left(\frac{n}{m} \cdot 360° + \beta_{off} + \beta_{\Delta 1}\right) \cdot Z_{yx}^{R2} +$$
$$\sin\theta_T \sin\beta_T \sin\theta_{R1} \sin\beta_{R1} \cdot Z_{yy}^{R2} +$$
$$\sin\theta_T \sin\beta_T \cos\left(\frac{n}{m} \cdot 360° + \beta_{off} + \beta_{\Delta 1}\right) \cdot Z_{yz}^{R2} +$$
$$\cos\theta_T \sin\theta_{R1} \cos\left(\frac{n}{m} \cdot 360° + \beta_{off} + \beta_{\Delta 1}\right) \cdot Z_{zx}^{R2} +$$
$$\cos\theta_T \sin\theta_{R1} \sin\left(\frac{n}{m} \cdot 360° + \beta_{off} + \beta_{\Delta 1}\right) \cdot Z_{zy}^{R2} +$$
$$\cos\theta_T \cos\left(\frac{n}{m} \cdot 360° + \beta_{off} + \beta_{\Delta 1}\right) \cdot Z_{zz}^{R2}$$

$$V_2(n) = \sin\theta_T \cos\beta_T \sin\theta_{R2} \cos\left(\frac{n}{m} \cdot 360° + \beta_{off}\right) \cdot Z_{xx}^{R2} +$$
$$\sin\theta_T \cos\beta_T \sin\theta_{R2} \sin\left(\frac{n}{m} \cdot 360° + \beta_{off}\right) \cdot Z_{xy}^{R2} +$$
$$\sin\theta_T \cos\beta_T \cos\left(\frac{n}{m} \cdot 360° + \beta_{off}\right) \cdot Z_{xz}^{R2} +$$
$$\sin\theta_T \sin\beta_T \sin\theta_{R2} \cos\left(\frac{n}{m} \cdot 360° + \beta_{off}\right) \cdot Z_{yx}^{R2} +$$
$$\sin\theta_T \sin\beta_T \sin\theta_{R1} \sin\left(\frac{n}{m} \cdot 360° + \beta_{off}\right) \cdot Z_{yy}^{R22} +$$
$$\sin\theta_T \sin\beta_T \cos\left(\frac{n}{m} \cdot 360° + \beta_{off}\right) \cdot Z_{yz}^{R2} + \cos\theta_T \sin\theta_{R2} \cos\beta_{R2} \cdot Z_{zx}^{R2} +$$
$$\cos\theta_T \sin\theta_{R2} \sin\left(\frac{n}{m} \cdot 360° + \beta_{off}\right) \cdot Z_{zy}^{R2} + \cos\theta_T \cos\left(\frac{n}{m} \cdot 360° + \beta_{off}\right) \cdot Z_{zz}^{R2}$$

$$V_3(n) = \sin\theta_T \cos\beta_T \sin\theta_{R3} \cos\left(\frac{n}{m} \cdot 360° + \beta_{off} + \beta_{\Delta 2}\right) \cdot Z_{xx}^{R2} +$$
$$\sin\theta_T \cos\beta_T \sin\theta_{R3} \sin\left(\frac{n}{m} \cdot 360° + \beta_{off} + \beta_{\Delta 2}\right) \cdot Z_{xy}^{R2} +$$
$$\sin\theta_T \cos\beta_T \cos\left(\frac{n}{m} \cdot 360° + \beta_{off} + \beta_{\Delta 2}\right) \cdot Z_{xz}^{R2} +$$
$$\sin\theta_T \sin\beta_T \sin\theta_{R3} \cos\left(\frac{n}{m} \cdot 360° + \beta_{off} + \beta_{\Delta 2}\right) \cdot Z_{yx}^{R2} +$$
$$\sin\theta_T \sin\beta_T \sin\theta_{R3} \sin\left(\frac{n}{m} \cdot 360° + \beta_{off} + \beta_{\Delta 2}\right) \cdot Z_{yy}^{R2} +$$
$$\sin\theta_T \sin\beta_T \cos\left(\frac{n}{m} \cdot 360° + \beta_{off} + \beta_{\Delta 2}\right) \cdot Z_{yz}^{R2} +$$
$$\cos\theta_T \sin\theta_{R3} \cos\left(\frac{n}{m} \cdot 360° + \beta_{off} + \beta_{\Delta 2}\right) \cdot Z_{zx}^{R2} +$$
$$\cos\theta_T \sin\theta_{R3} \sin\left(\frac{n}{m} \cdot 360° + \beta_{off} + \beta_{\Delta 2}\right) \cdot Z_{zy}^{R2} +$$
$$\cos\theta_T \cos\left(\frac{n}{m} \cdot 360° + \beta_{off} + \beta_{\Delta 2}\right) \cdot Z_{zz}^{R2}$$

where $V_1(n)$ is the first response signal with respect to index n, $V_2(n)$ is the second response signal with respect to index n, and $V_3(n)$ is the third response signal with respect to index n.

Statement 14. The apparatus of any of statements 11-13 wherein each response signal with respect to n is:

$$\begin{bmatrix} V_1(n=1) \\ V_2(n=1) \\ V_3(n=1) \\ \vdots \\ V_1(n=m) \\ V_2(n=m) \\ V_3(n=m) \end{bmatrix} = \overline{\overline{B}}_{m \times 9} \cdot \begin{bmatrix} Z_{xx}^{R2} \\ Z_{xy}^{R2} \\ Z_{xz}^{R2} \\ Z_{yx}^{R2} \\ Z_{yy}^{R2} \\ Z_{yz}^{R2} \\ Z_{zx}^{R2} \\ Z_{zy}^{R2} \\ Z_{zz}^{R2} \end{bmatrix}$$

where $\overline{\overline{B}}_{m \times 9}$ is an m by 9 matrix comprising coefficients from each response signal with respect to n for the first receiver, the second receiver, and the third receiver from n to m, wherein the step solving the series of linear equations comprises solving for a vector defined as:

$$\begin{bmatrix} Z_{xx}^{R2} \\ Z_{xy}^{R2} \\ Z_{xz}^{R2} \\ Z_{yx}^{R2} \\ Z_{yy}^{R2} \\ Z_{yz}^{R2} \\ Z_{zx}^{R2} \\ Z_{zy}^{R2} \\ Z_{zz}^{R2} \end{bmatrix}$$

and wherein the vector is solved for using least square matrix inversion using a Hermitian operator such that:

$$\begin{bmatrix} Z_{xx}^{R2} \\ Z_{xy}^{R2} \\ Z_{xz}^{R2} \\ Z_{yx}^{R2} \\ Z_{yy}^{R2} \\ Z_{yz}^{R2} \\ Z_{zx}^{R2} \\ Z_{zy}^{R2} \\ Z_{zz}^{R2} \end{bmatrix} = \left( \overline{\overline{B}}_{m \times 9}^{H} \cdot \overline{\overline{B}}_{m \times 9} \right)^{-1} \cdot \overline{\overline{B}}_{m \times 9}^{H} \cdot \begin{bmatrix} V_1(n=1) \\ V_2(n=1) \\ V_3(n=1) \\ \vdots \\ V_1(n=m) \\ V_2(n=m) \\ V_3(n=m) \end{bmatrix}$$

where H is the Hermitian operator.

Statement 15. The apparatus of any of statements 11-14 wherein the vector is solved for using least square matrix inversion using a Hermitian operator and Tikhonov regularization is applied such that:

$$\begin{bmatrix} Z_{xx}^{R2} \\ Z_{xy}^{R2} \\ Z_{xz}^{R2} \\ Z_{yx}^{R2} \\ Z_{yy}^{R2} \\ Z_{yz}^{R2} \\ Z_{zx}^{R2} \\ Z_{zy}^{R2} \\ Z_{zz}^{R2} \end{bmatrix} = \left( \overline{\overline{B}}_{m \times 9}^{H} \cdot \overline{\overline{B}}_{m \times 9} + \lambda \overline{\overline{I}} \right)^{-1} \cdot \overline{\overline{B}}_{m \times 9}^{H} \cdot \begin{bmatrix} V_1(n=1) \\ V_2(n=1) \\ V_3(n=1) \\ \vdots \\ V_1(n=m) \\ V_2(n=m) \\ V_3(n=m) \end{bmatrix}$$

where $\lambda$ is a regularization factor and wherein $\lambda$ is determined by an L-curve method.

Statement 16. A system comprising:
a tool comprising:
a transmitter sub comprising a transmitter coil;
a first receiver sub comprising a first receiver coil;
a second receiver sub comprising a second receiver coil; and
a third receiver sub comprising a third receiver coil;
wherein the transmitter sub is configured to generate an electromagnetic wave at the transmitter coil and propagate the electromagnetic wave through a subterranean formation, wherein the first receiver coil is configured to receive the electromagnetic wave and generate a first response signal, wherein the second receiver coil is configured to receive the electromagnetic wave and generate a second response signal, and wherein the third receiver coil is configured to receive the electromagnetic wave and generate a third response signal;
a conveyance electrically coupled to the tool; and
a surface processing unit comprising:
at least one processor; and
a memory coupled to the processor to provide software that configures the processor to solve a series of linear equations defined by an orientation of the transmitter sub, first receiver sub, second receiver sub, and third receiver sub orientation in the wellbore, and the first response signal, the second response signal, and the first response signal to determine a Green's response tensor.

Statement 17. The system of statement 16 wherein the series of linear equations has the following form for a response signal corresponding to each receiver, the response signal being the first response signal, the second response signal, or the third response signal;

for the first receiver coil:

$V_1(\theta_T, \beta_T, \theta_{R1}, \beta_{R1}) = \sin\theta_T \cos\beta_T \sin\theta_{R1} \cos\beta_{R1} \cdot Z_{xx}^{R1} + \sin\theta_T \cos\beta_T \sin\theta_{R1} \sin\beta_{R1} \cdot Z_{xy}^{R1} + \sin\theta_T \cos\beta_T \cos\beta_{R1} \cdot Z_{xz}^{R1} + \sin\theta_T \sin\beta_T \sin\theta_{R1} \cos\beta_{R1} \cdot Z_{yx}^{R1} + \sin\theta_T \sin\beta_T \sin\theta_{R1} \sin\beta_{R1} \cdot Z_{yy}^{R1} + \sin\theta_T \sin\beta_T \cos\beta_{R1} \cdot Z_{yz}^{R1} + \cos\theta_T \sin\theta_{R1} \cos\beta_{R1} \cdot Z_{zx}^{R1} + \cos\theta_T \sin\theta_{R1} \sin\beta_{R1} \cdot Z_{zy}^{R1} + \cos\theta_T \cos\beta_{R1} \cdot Z_{zz}^{R1}$ where $V_1(\theta_T, \beta_T, \theta_{R1}, \beta_{R1})$ is the first response signal, $\theta_T$ is a tilt angle of the transmitter coil, $\beta_T$ is an azimuth angle of the transmitter coil, $Z_{xx}^{R1}$ is a component of the first response signal oriented in an X direction caused by the transmitter coil in the X direction, $Z_{xy}^{R1}$ is a component of the first response signal oriented in a Y direction caused by the transmitter coil in the X direction, $Z_{xz}^{R1}$ is a component of the first response signal oriented in a Z direction caused by the transmitter coil in the X direction, $Z_{yx}^{R1}$ is a component of the first response signal oriented in the X direction caused by the transmitter coil in the Y direction, $Z_{yy}^{R1}$ is a component of the first response signal oriented in the Y direction caused by the transmitter coil in the Y direction, $Z_{yx}^{R1}$ is a component of the first response signal oriented in the Z direction caused by the transmitter coil in the Y direction, $Z_{zx}^{R1}$ is a component of the first response signal oriented in the X direction caused by the transmitter coil in the Z direction, $Z_{zx}^{R1}$ is a component of the first response signal oriented in the Y direction caused by the transmitter coil in the Z direction, $Z_{zz}^{R1}$ i is a component of the first response signal oriented in the Z direction caused by the transmitter coil in the Z direction, $\theta_{R1}$ is a tilt angle of the first receiver coil, and $\beta_{R1}$ is an azimuth angle of the receiver coil;

for the second receiver coil:

$V_2(\theta_T, \beta_T, \theta_{R2}, \beta_{R2}) = \sin\theta_T \cos\beta_T \sin\theta_{R2} \cos\beta_{R2} \cdot Z_{xx}^{R2} + \sin\theta_T \cos\beta_T \sin\theta_{R2} \sin\beta_{R2} \cdot Z_{xy}^{R2} + \sin\theta_T \cos\beta_T \cos\beta_{R2} \cdot Z_{xz}^{R2} + \sin\theta_T \sin\beta_T \sin\theta_{R2} \cos\beta_{R2} \cdot Z_{yx}^{R2} + \sin\theta_T \sin\beta_T \sin\theta_{R1} \sin\beta_{R2} \cdot Z_{yy}^{R22} + \sin\theta_T \sin\beta_T \cos\beta_{R2} \cdot Z_{yz}^{R2} + \cos\theta_T \sin\theta_{R2} \cos\beta_{R2} \cdot Z_{zx}^{R2} + \cos\theta_T \sin\theta_{R2} \sin\beta_{R2} \cdot Z_{zy}^{R2} + \cos\theta_T \cos\beta_{R2} \cdot Z_{zz}^{R2}$ where $V_2(\theta_T, \beta_T, \theta_{R2}, \beta_{R2})$ is the second response signal, $\theta_T$ is the tilt angle of the transmitter coil, $\beta_T$ is the azimuth angle of the transmitter coil, $Z_{xx}^{R2}$ is a component of the second response signal oriented in the X direction caused by the transmitter coil in the X direction, $Z_{xy}^{R2}$ is a component of the second response signal oriented in the Y direction caused by the transmitter coil in the X direction, $Z_{xz}^{R2}$ is a component of the second response signal oriented in the Z direction caused by the transmitter coil in the X direction, $Z_{yx}^{R2}$ is a component of the second response signal oriented in the X direction caused by the transmitter coil in the Y direction, $Z_{yy}^{R2}$ is a component of the second response signal oriented in the Y direction caused by the transmitter coil in the Y direction, $Z_{yz}^{R2}$ is a component of the second response signal oriented in the Z direction caused by the transmitter coil in the Y direction, $Z_{zx}^{R2}$ is a component of the second response signal oriented in the X direction caused by the transmitter coil in the Z direction, $Z_{zx}^{R2}$ is a component of the second response signal oriented in the Y direction caused by the transmitter coil in the Z direction, $Z_{zz}^{R2}$ is a component of the second response signal oriented in the Z direction caused by the transmitter coil in the Z direction, $\theta_{R2}$ is a tilt angle of the second receiver coil, and $\beta_{R2}$ is an azimuth angle of the second receiver coil;

for the third receiver:

$V_3(\theta_T, \beta_T, \theta_{R3}, \beta_{R1}) = \sin\theta_T \cos\beta_T \sin\theta_{R3} \cos\beta_{R3} \cdot Z_{xx}^{R3} + \sin\theta_T \cos\beta_T \sin\theta_{R3} \sin\beta_{R3} \cdot Z_{xy}^{R3} + \sin\theta_T \cos\beta_T \cos\beta_{R3} \cdot Z_{xz}^{R3} + \sin\theta_T \sin\beta_T \sin\theta_{R3} \cos\beta_{R3} \cdot Z_{yx}^{R3} + \sin\theta_T \sin\beta_T \sin\theta_{R3} \sin$ $\beta_{R3} \cdot Z_{yy}^{R3} + \sin\theta_T \sin\beta_T \cos\beta_{R3} \cdot Z_{yz}^{R3} + \cos\theta_T \sin\theta_{R3} \cos\beta_{R3} \cdot Z_{zx}^{R3} + \cos\theta_T \sin\theta_{R3} \sin\beta_{R3} \cdot Z_{zy}^{R3} + \cos\theta_T \cos\beta_{R3} \cdot Z_{zz}^{R3}$ where $V_3(\theta_T, \beta_T, \theta_{R3}, \beta_{R3})$ is the third response signal, $\theta_T$ is the tilt angle of the transmitter coil, $\beta_T$ is the azimuth angle of the transmitter coil, $Z_{xx}^{R3}$ is a component of the third response signal oriented in the X direction caused by the transmitter coil in the X direction, $Z_{xy}^{R3}$ is a component of the third response signal oriented in the Y direction caused by the transmitter coil in the X direction, $Z_{xz}^{R3}$ is a component of the third response signal oriented in the Z direction caused by the transmitter coil in the X direction, $Z_{yx}^{R3}$ is a component of the third response signal oriented in the X direction caused by the transmitter coil in the Y direction, $Z_{yy}^{R3}$ i is a component of the third response signal oriented in the Y direction caused by the transmitter coil in the Y direction, $Z_{yz}^{R3}$ is a component of the third response signal oriented in the Z direction caused by the transmitter coil in the Y direction, $Z_{zx}^{R3}$ is a component of the third response signal oriented in the X direction caused by the transmitter coil in the Z direction, $Z_{zx}^{R3}$ is a component of the third response signal oriented in the Y direction caused by the transmitter coil in the Z direction, $Z_{zz}^{R3}$ is a component of the third response signal oriented in the Z direction caused by the transmitter coil in the Z direction, $\theta_{R3}$ is a tilt angle of the receiver coil, and $\beta_{R3}$ is an azimuth angle of the third receiver coil.

Statement 18. The apparatus of any of statements 16-17 wherein each azimuth angle is found by the following equations:
azimuth angle of the transmitter coil:

$$\beta_T = \frac{n}{m} \cdot 360°$$

where $\beta_T$ is the azimuth angle of the transmitter coil, m is a number of times the receivers sample per turn of the apparatus in the wellbore, and n is an index from 1 to m; azimuth angle of the transmitter coil:

$$\beta_T = \frac{n}{m} \cdot 360°$$

where $\beta_T$ is the azimuth angle of the transmitter coil, m is a number of times the first receiver coil samples per turn of the apparatus in the wellbore, and n is an index from 1 to m; azimuth angle of the first receiver coil:

$\beta_{R1} = \beta_T + \beta_{\text{off}} + \beta_{\Delta 1}$ where $\beta_{R1}$ is the azimuth angle of the first receiver coil, $\beta_{\text{off}}$ is the difference in azimuthal angle between the transmitter coil and the second receiver coil, $\beta_{\Delta 1}$ is the difference in azimuthal angle between the first receiver coil and the second receiver coil,
azimuth angle of the second receiver:

$\beta_{R2} = \beta_T + \beta_{\text{off}}$ where $\beta_{R2}$ is the azimuth angle of the second receiver coil, azimuth angle of the third receiver coil:

$\beta_{R3} = \beta_T + \beta_{\text{off}} + \beta_{\Delta 2}$ where $\beta_{R2}$ is the azimuth angle of the second receiver coil and $\beta_{\Delta 2}$ the difference in azimuthal angle between the second receiver coil and third receiver coil, and wherein an assumption of $Z_{..}^{R1} \approx Z_{..}^{R2} \approx Z_{..}^{R3}$ is applied to each response signal equation such that:

$$V_1(n) = \sin\theta_T \cos\beta_T \sin\theta_{R1} \cos\left(\frac{n}{m} \cdot 360° + \beta_{\text{off}} + \beta_{\Delta 1}\right) \cdot Z_{xx}^{R2} +$$

$$\sin\theta_T \cos\beta_T \sin\theta_{R1} \sin\left(\frac{n}{m} \cdot 360° + \beta_{\text{off}} + \beta_{\Delta 1}\right) \cdot Z_{xy}^{R2} +$$

$$\sin\theta_T \cos\beta_T \cos\left(\frac{n}{m} \cdot 360° + \beta_{\text{off}} + \beta_{\Delta 1}\right) \cdot Z_{xz}^{R2} +$$

$$\sin\theta_T \sin\beta_T \sin\theta_{R1} \cos\left(\frac{n}{m} \cdot 360° + \beta_{\text{off}} + \beta_{\Delta 1}\right) \cdot Z_{yx}^{R2} +$$

$$\sin\theta_T \sin\beta_T \sin\theta_{R1} \sin\beta_{R1} \cdot Z_{yy}^{R2} +$$

$$\sin\theta_T \sin\beta_T \cos\left(\frac{n}{m} \cdot 360° + \beta_{\text{off}} + \beta_{\Delta 1}\right) \cdot Z_{yz}^{R2} +$$

$$\cos\theta_T \sin\theta_{R1} \cos\left(\frac{n}{m} \cdot 360° + \beta_{\text{off}} + \beta_{\Delta 1}\right) \cdot Z_{zx}^{R2} +$$

$$\cos\theta_T \sin\theta_{R1} \sin\left(\frac{n}{m} \cdot 360° + \beta_{\text{off}} + \beta_{\Delta 1}\right) \cdot Z_{zy}^{R2} +$$

$$\cos\theta_T \cos\left(\frac{n}{m} \cdot 360° + \beta_{\text{off}} + \beta_{\Delta 1}\right) \cdot Z_{zz}^{R2}$$

$$V_2(n) = \sin\theta_T \cos\beta_T \sin\theta_{R2} \cos\left(\frac{n}{m} \cdot 360° + \beta_{\text{off}}\right) \cdot Z_{xx}^{R2} +$$

$$\sin\theta_T \cos\beta_T \sin\theta_{R2} \sin\left(\frac{n}{m} \cdot 360° + \beta_{\text{off}}\right) \cdot Z_{xy}^{R2} +$$

$$\sin\theta_T \cos\beta_T \cos\left(\frac{n}{m} \cdot 360° + \beta_{\text{off}}\right) \cdot Z_{xz}^{R2} +$$

$$\sin\theta_T \sin\beta_T \sin\theta_{R2} \cos\left(\frac{n}{m} \cdot 360° + \beta_{\text{off}}\right) \cdot Z_{yx}^{R2} +$$

$$\sin\theta_T \sin\beta_T \sin\theta_{R1} \sin\left(\frac{n}{m} \cdot 360° + \beta_{\text{off}}\right) \cdot Z_{yy}^{R22} +$$

$$\sin\theta_T \sin\beta_T \cos\left(\frac{n}{m} \cdot 360° + \beta_{0\text{ff}}\right) \cdot Z_{yz}^{R2} + \cos\theta_T \sin\theta_{R2} \cos\beta_{R2} \cdot Z_{zx}^{R2} +$$

$$\cos\theta_T \sin\theta_{R2} \sin\left(\frac{n}{m} \cdot 360° + \beta_{\text{off}}\right) \cdot Z_{zy}^{R2} + \cos\theta_T \cos\left(\frac{n}{m} \cdot 360° + \beta_{\text{off}}\right) \cdot Z_{zz}^{R2}$$

$$V_3(n) = \sin\theta_T \cos\beta_T \sin\theta_{R3} \cos\left(\frac{n}{m} \cdot 360° + \beta_{\text{off}} + \beta_{\Delta 2}\right) \cdot Z_{xx}^{R2} +$$

$$\sin\theta_T \cos\beta_T \sin\theta_{R3} \sin\left(\frac{n}{m} \cdot 360° + \beta_{\text{off}} + \beta_{\Delta 2}\right) \cdot Z_{xy}^{R2} +$$

$$\sin\theta_T \cos\beta_T \cos\left(\frac{n}{m} \cdot 360° + \beta_{\text{off}} + \beta_{\Delta 2}\right) \cdot Z_{xz}^{R2} +$$

$$\sin\theta_T \sin\beta_T \sin\theta_{R3} \cos\left(\frac{n}{m} \cdot 360° + \beta_{\text{off}} + \beta_{\Delta 2}\right) \cdot Z_{yx}^{R2} +$$

$$\sin\theta_T \sin\beta_T \sin\theta_{R3} \sin\left(\frac{n}{m} \cdot 360° + \beta_{\text{off}} + \beta_{\Delta 2}\right) \cdot Z_{yy}^{R2} +$$

$$\sin\theta_T \sin\beta_T \cos\left(\frac{n}{m} \cdot 360° + \beta_{\text{off}} + \beta_{\Delta 2}\right) \cdot Z_{yz}^{R2} +$$

$$\cos\theta_T \sin\theta_{R3} \cos\left(\frac{n}{m} \cdot 360° + \beta_{\text{off}} + \beta_{\Delta 2}\right) \cdot Z_{zx}^{R2} +$$

$$\cos\theta_T \sin\theta_{R3} \sin\left(\frac{n}{m} \cdot 360° + \beta_{\text{off}} + \beta_{\Delta 2}\right) \cdot Z_{zy}^{R2} +$$

$$\cos\theta_T \cos\left(\frac{n}{m} \cdot 360° + \beta_{\text{off}} + \beta_{\Delta 2}\right) \cdot Z_{zz}^{R2}$$

where $V_1(n)$ is the first response signal with respect to index n, $V_2(n)$ is the second response signal with respect to index n, and $V_3(n)$ is the third response signal with respect to index n.

Statement 19. The apparatus of any of statements 16-18 wherein each response signal with respect to n is:

$$\begin{bmatrix} V_1(n=1) \\ V_2(n=1) \\ V_3(n=1) \\ \vdots \\ V_1(n=m) \\ V_2(n=m) \\ V_3(n=m) \end{bmatrix} = \overline{\overline{B}}_{m \times 9} \cdot \begin{bmatrix} Z^{R2}_{xx} \\ Z^{R2}_{xy} \\ Z^{R2}_{xz} \\ Z^{R2}_{yx} \\ Z^{R2}_{yy} \\ Z^{R2}_{yz} \\ Z^{R2}_{zx} \\ Z^{R2}_{zy} \\ Z^{R2}_{zz} \end{bmatrix}$$

where $\overline{\overline{B}}_{m \times 9}$ is an m by 9 matrix comprising coefficients from each of the first response signal, second response signal, and third response signal with respect to index n to m, wherein the step solving the series of linear equations comprises solving for a vector defined as:

$$\begin{bmatrix} Z^{R2}_{xx} \\ Z^{R2}_{xy} \\ Z^{R2}_{xz} \\ Z^{R2}_{yx} \\ Z^{R2}_{yy} \\ Z^{R2}_{yz} \\ Z^{R2}_{zx} \\ Z^{R2}_{zy} \\ Z^{R2}_{zz} \end{bmatrix}$$

and wherein the vector is solved for using least square matrix inversion using a Hermitian operator such that:

$$\begin{bmatrix} Z^{R2}_{xx} \\ Z^{R2}_{xy} \\ Z^{R2}_{xz} \\ Z^{R2}_{yx} \\ Z^{R2}_{yy} \\ Z^{R2}_{yz} \\ Z^{R2}_{zx} \\ Z^{R2}_{zy} \\ Z^{R2}_{zz} \end{bmatrix} = \left( \overline{\overline{B}}^H_{m \times 9} \cdot \overline{\overline{B}}_{m \times 9} \right)^{-1} \cdot \overline{\overline{B}}^H_{m \times 9} \cdot \begin{bmatrix} V_1(n=1) \\ V_2(n=1) \\ V_3(n=1) \\ \vdots \\ V_1(n=m) \\ V_2(n=m) \\ V_3(n=m) \end{bmatrix}$$

where H is the Hermitian operator.

Statement 20. The apparatus of any of statements 16-18 wherein the vector is solved for using least square matrix inversion using a Hermitian operator and Tikhonov regularization is applied such that:

$$\begin{bmatrix} Z^{R2}_{xx} \\ Z^{R2}_{xy} \\ Z^{R2}_{xz} \\ Z^{R2}_{yx} \\ Z^{R2}_{yy} \\ Z^{R2}_{yz} \\ Z^{R2}_{zx} \\ Z^{R2}_{zy} \\ Z^{R2}_{zz} \end{bmatrix} = \left( \overline{\overline{B}}^H_{m \times 9} \cdot \overline{\overline{B}}_{m \times 9} + \lambda \overline{\overline{I}} \right)^{-1} \cdot \overline{\overline{B}}^H_{m \times 9} \cdot \begin{bmatrix} V_1(n=1) \\ V_2(n=1) \\ V_3(n=1) \\ \vdots \\ V_1(n=m) \\ V_2(n=m) \\ V_3(n=m) \end{bmatrix}$$

where $\lambda$ is a regularization factor and wherein $\lambda$ is determined by an L-curve method.

The preceding description provides various examples of the wellbore tools and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

What is claimed is:
1. A method comprising:
 inserting into a wellbore penetrating a subterranean formation an apparatus comprising:
  a transmitter sub comprising a transmitter coil;
  a first receiver sub comprising a first receiver coil;
  a second receiver sub comprising a second receiver coil; and
  a third receiver sub comprising a third receiver coil;
 generating an electromagnetic wave at the transmitter coil;
 propagating the electromagnetic wave through the subterranean formation;

receiving the electromagnetic wave in the first receiver coil, the second receiver coil, and the third receiver coil;

generating a plurality of response signals, wherein the plurality of response signals comprises a first response signal in the first receiver coil, a second response signal in the second receiver coil, and a third response signal the third receiver coil;

solving a series of linear equations defined by an orientation of the transmitter sub in the wellbore, orientation in the wellbore for each of the first receiver coil, the second receiver coil, and the third receiver coil, and the plurality of response signals to determine a Green's response tensor wherein the series of linear equations have the following form for each of the response signals:

$$V(\theta_T, \beta_T, \theta_R, \beta_R)$$
$$= [\sin\theta_T\cos\beta_T \quad \sin\theta_T\sin\beta_T \quad \cos\theta_T] \begin{bmatrix} Z_{xx} & Z_{xy} & Z_{xz} \\ Z_{yx} & Z_{yy} & Z_{yz} \\ Z_{zx} & Z_{zy} & Z_{zz} \end{bmatrix} \begin{bmatrix} \sin\theta_R\cos\beta_R \\ \sin\theta_R\sin\beta_R \\ \cos\theta_R \end{bmatrix}$$

where $V(\theta_T, \beta_T, \theta_R, \beta_R)$ is the response signal for receiver coil i, $\theta_T$ is a tilt angle of the transmitter coil, $\beta_T$ is an azimuth angle of the transmitter coil, $\beta_R$ is a tilt angle of the receiver coil i, $\beta_R$ is an azimuth angle of the receiver coil i, $Z_{xx}$ is a component of the response signal for receiver coil i oriented in an X direction caused by the transmitter coil in the X direction, $Z_{xy}$ is a component of the response signal for receiver coil i oriented in a Y direction caused by the transmitter coil in the X direction, $Z_{zz}$ is a component of the response signal for receiver coil i oriented in an Z direction caused by the transmitter coil in the X direction, $Z_{xy}$ is a component of the response signal for receiver coil i oriented in the X direction caused by the transmitter coil in the Y direction, $Z_{yy}$ is a component of the response signal for receiver coil i oriented in the Y direction caused by the transmitter coil in the Y direction, $Z_{yz}$ is a component of the response signal for receiver coil i oriented in the Z direction caused by the transmitter coil in the Y direction, $Z_{zx}$ is a component of the response signal for receiver coil i oriented in the X direction caused by the transmitter coil in the Z direction, $Z_{zy}$ i is a component of the response signal for receiver coil i oriented in Y direction caused by the transmitter coil in the Z direction, $Z_{zz}$ is a component of the response signal for receiver coil i oriented in the Z direction caused by the transmitter coil in the Z direction, $\theta_R$ is a tilt angle of the receiver coil i, and $\beta_R$ is an azimuth angle of the receiver coil i, wherein receiver coil i is one of the first receiver coil, the second receiver coil, or the third receiver coil.

2. A method comprising:

inserting into a wellbore penetrating a subterranean formation an apparatus comprising:
a transmitter sub comprising a transmitter coil;
a first receiver sub comprising a first receiver coil;
a second receiver sub comprising a second receiver coil; and
a third receiver sub comprising a third receiver coil;
generating an electromagnetic wave at the transmitter coil;
propagating the electromagnetic wave through the subterranean formation;
receiving the electromagnetic wave in the first receiver coil, the second receiver coil, and the third receiver coil;
generating a plurality of response signals, wherein the plurality of response signals comprises a first response signal in the first receiver coil, a second response signal in the second receiver coil, and a third response signal the third receiver coil;
solving a series of linear equations defined by an orientation of the transmitter sub in the wellbore, orientation in the wellbore for each of the first receiver coil, the second receiver coil, and the third receiver coil, and the plurality of response signals to determine a Green's response tensor
wherein the series of linear equations has the following form for the response signal corresponding to each receiver coil;

for the first receiver coil:
$V_1(\theta_T,\beta_T,\theta_{R1},\beta_{R1}) = \sin\theta_T \cos\beta_T \sin\theta_{R1} \cos\beta_{R1} \cdot Z_{xx}^{R1} + \sin\theta_T \cos\beta_T \sin\theta_{R1} \sin\beta_{R1} \cdot Z_{xy}^{R1} + \sin\theta_T \cos\beta_T \cos\beta_{R1} \cdot Z_{xz}^{R1} + \sin\theta_T \sin\beta_T \sin\theta_{R1} \cos\beta_{R1} \cdot Z_{yx}^{R1} + \sin\theta_T \sin\beta_T \sin\theta_{R1} \sin\beta_{R1} \cdot Z_{yy}^{R1} + \sin\theta_T \sin\beta_T \cos\beta_{R1} \cdot Z_{yz}^{R1} + \cos\theta_T \sin\theta_{R1} \cos\beta_{R1} \cdot Z_{zx}^{R1} + \cos\theta_T \sin\theta_{R1} \sin\beta_{R1} \cdot Z_{zy}^{R1} + \cos\theta_T \cos\beta_{R1} \cdot Z_{zz}^{R1}$ where $v_1(\theta_T, \beta_T, \theta_{R1}, \beta_{R1})$ is the response signal of the first receiver coil, $\theta_T$ is a tilt angle of the transmitter coil, $\beta_T$ is an azimuth angle of the transmitter coil, $z_{xx}^{R1}$ is a component of the first response signal oriented in an X direction caused by the transmitter coil in the X direction, $Z_{xy}^{R1}$ is a component of the first response signal oriented in a Y direction caused by the transmitter coil in the X direction, $Z_{XZ}^{R1}$ is a component of the first response signal oriented in a Z direction caused by the transmitter coil in the X direction, $Z_{yx}^{R1}$ is a component of the first response signal oriented in the X direction caused by the transmitter coil in the Y direction, $Z_{yy}^{R1}$ is a component of the first response signal oriented in the Y direction caused by the transmitter coil in the Y direction, $Z_{yz}^{R1}$ is a component of the first response signal oriented in the Z direction caused by the transmitter coil in the Y direction, $Z_{zx}^{R1}$ is a component of the first response signal oriented in the X direction caused by the transmitter coil in the Z direction, $Z_{zx}^{R1}$ is a component of the first response signal oriented in the Y direction caused by the transmitter coil in the Z direction, $z_{zz}^{R1}$ is a component of the first response signal oriented in the Z direction caused by the transmitter coil in the Z direction, $\theta_{R1}$ is a tilt angle of the first receiver coil, and $\beta_{R1}$ is an azimuth angle of the first receiver coil;

for the second receiver coil:
$V_2(\theta_T,\beta_T,\theta_{R2},\beta_{R2}) = \sin\theta_T \cos\beta_T \sin\theta_{R2} \cos\beta_{R2} \cdot Z_{xx}^{R2} + \sin\theta_T \cos\beta_T \sin\theta_{R2} \sin\beta_{R2} \cdot Z_{xy}^{R2} + \sin\theta_T \cos\beta_T \cos\beta_{R2} \cdot Z_{xz}^{R2} + \sin\theta_T \sin\beta_T \sin\theta_{R2} \cos\beta_{R2} \cdot Z_{yx}^{R2} + \sin\theta_T \sin\beta_T \sin\theta_{R1} \sin\beta_{R2} \cdot Z_{yy}^{R22} + \sin\theta_T \sin\beta_T \cos\beta_{R2} \cdot Z_{yz}^{R2} + \cos\theta_T \sin\theta_{R2} \cos\beta_{R2} \cdot Z_{zx}^{R2} + \cos\theta_T \sin\theta_{R2} \sin\beta_{R2} \cdot Z_{zy}^{R2} + \cos\theta_T \cos\beta_{R2} \cdot Z_{zz}^{R2}$ where $v_2(\theta_T, \beta_T, \theta_{R2}, \beta_{R2})$ is the response signal of the second receiver coil, $\theta_T$ is the tilt angle of the transmitter coil, $\beta_T$ is the azimuth angle of the transmitter coil, $z_{xx}^{R2}$ is a component of the second response signal oriented in the X direction caused by the transmitter coil in the X direction, $Z_{xy}^{R2}$ is a component of the second response signal oriented in the Y direction caused by the transmitter coil in the X direction, $Z_{xz}^{R2}$ is a component of the second response signal oriented in the X direction, $z_{yx}^{R2}$ is a component of the second response signal oriented in the Y direction, $Z_{yy}^{R2}$ is a component of the second response signal oriented in the Y direction caused by the transmitter coil in the Y direction, $Z_{yz}^{R2}$ is a component of the second response signal oriented in the Z direction caused by the transmitter coil in the Y direction, $Z_{zx}^{R2}$ is a component of the second response signal oriented in the X direction caused by the transmitter coil in the Z direction, $Z_{zx}^{R2}$ is a component of the second response signal oriented in the Y direction caused by the transmitter coil in the Z direction, $z_{zz}^{R2}$ is a component of the second response signal oriented in the Z direction caused by the transmitter coil in the Z direction, $\theta_{R2}$ is a tilt angle of the second receiver coil, and $\beta_{R2}$ is an azimuth angle of the second receiver coil;

for the third receiver coil:
$V_3(\theta_T,\beta_T,\theta_{R3},\beta_{R1})$=sin $\theta_T$ cos $\beta_T$ sin $\theta_{R3}$ cos $\beta_{R3}\cdot Z_{xx}^{R3}$+sin $\theta_T$ cos $\beta_T$ sin $\theta_{R3}$ sin $\beta_{R3}\cdot Z_{xy}^{R3}$+sin $\theta_T$ cos $\beta_T$ cos $\beta_{R3}\cdot Z_{xz}^{R3}$+sin $\theta_T$ sin $\beta_T$ sin $\theta_{R3}$ cos $\beta_{R3}\cdot Z_{yx}^{R3}$+sin $\theta_T$ sin $\beta_T$ sin $\theta_{R3}$ sin $\beta_{R3}\cdot Z_{yy}^{R3}$+sin $\theta_T$ sin $\beta_T$ cos $\beta_{R3}\cdot Z_{yz}^{R3}$+cos $\theta_T$ sin $\theta_{R3}$ cos $\beta_{R3}\cdot Z_{zx}^{R3}$+cos $\theta_T$ sin $\theta_{R3}$ sin $\beta_{R3}\cdot Z_{zy}^{R3}$+cos $\theta_T$ cos $\beta_{R3}\cdot Z_{zz}^{R3}$ where $V_3(\theta_T,\beta_T,\theta_{R3},\beta_{R3})$ is the third response signal, $\theta_T$ is the tilt angle of the transmitter coil, $\beta_T$ is the azimuth angle of the transmitter coil, $Z_{xx}^{R3}$ is a component of the third response signal oriented in the X direction caused by the transmitter coil in the X direction, $Z_{xy}^{R3}$ is a component of the third response signal oriented in the Y direction caused by the transmitter coil in the X direction, $Z_{xz}^{R3}$ is a component of the third response signal oriented in the Z direction caused by the transmitter coil in the X direction, $Z_{yx}^{R3}$ is a component of the third response signal oriented in the X direction caused by the transmitter coil in the Y direction, $Z_{yy}^{R3}$ i is a component of the third response signal oriented in the Y direction caused by the transmitter coil in the Y direction, $Z_{yz}^{R3}$ is a component of the third response signal oriented in the Z direction caused by the transmitter coil in the Y direction, $Z_{zx}^{R3}$ is a component of the third response signal oriented in the X direction caused by the transmitter coil in the Z direction, $Z_{zx}^{R3}$ is a component of the third response signal oriented in the Y direction caused by the transmitter coil in the Z direction, $Z_{zz}^{R3}$ is a component of the third response signal oriented in the Z direction caused by the transmitter coil in the Z direction, $\theta_{R3}$ is a tilt angle of the receiver coil, and $\beta_{R3}$ is an azimuth angle of the third receiver coil.

3. The method of claim 2 wherein each azimuth angle is found by the following equations:

azimuth angle of the transmitter coil:

$$\beta_T = \frac{n}{m} \cdot 360°$$

where $\beta_T$ is the azimuth angle of the transmitter coil, m is a number of times the first receiver coil samples per turn of the apparatus in the wellbore, and n is an index from 1 to m;

azimuth angle of the first receiver coil:

$\beta_{R1}=\beta^T+\beta_{off}+\beta_{\Delta 1}$ where $\beta_{R1}$ is the azimuth angle of the first receiver coil, $\beta_{off}$ is the difference in azimuthal angle between the transmitter coil and the second receiver coil, $\beta_{\Delta 1}$ is the difference in azimuthal angle between the first receiver coil and the second receiver coil, azimuth angle of the second receiver coil:

$\beta_{R2}=\beta_T+\beta_{off}$ where $\beta_{R2}$ is the azimuth angle of the second receiver coil, azimuth angle of the third receiver coil:

$\beta_{R2}=\beta_T+\beta_{off}+\beta_{\Delta 2}$ where $\beta_{R2}$ is the azimuth angle of the second receiver coil and $\beta_{\Delta 2}$ the difference in azimuthal angle between the second receiver coil and third receiver coil.

4. The method of claim 3 wherein an assumption of $Z_{..}^{R1} \approx Z_{..}^{R2} \approx Z_{..}^{R3}$ is applied to each response signal equation such that:

$$V_1(n) = \sin\theta_T\cos\beta_T\sin\theta_{R1}\cos\left(\frac{n}{m}\cdot 360° + \beta_{off} + \beta_{\Delta 1}\right)\cdot Z_{xx}^{R2} +$$
$$\sin\theta_T\cos\beta_T\sin\theta_{R1}\sin\left(\frac{n}{m}\cdot 360° + \beta_{off} + \beta_{\Delta 1}\right)\cdot Z_{xy}^{R2} +$$
$$\sin\theta_T\cos\beta_T\cos\left(\frac{n}{m}\cdot 360° + \beta_{off} + \beta_{\Delta 1}\right)\cdot Z_{xz}^{R2} +$$
$$\sin\theta_T\sin\beta_T\sin\theta_{R1}\cos\left(\frac{n}{m}\cdot 360° + \beta_{off} + \beta_{\Delta 1}\right)\cdot Z_{yx}^{R2} +$$
$$\sin\theta_T\sin\beta_T\sin\theta_{R1}\sin\beta_{R1}\cdot Z_{yy}^{R2} +$$
$$\sin\theta_T\sin\beta_T\cos\left(\frac{n}{m}\cdot 360° + \beta_{off} + \beta_{\Delta 1}\right)\cdot Z_{yz}^{R2} +$$
$$\cos\theta_T\sin\theta_{R1}\cos\left(\frac{n}{m}\cdot 360° + \beta_{off} + \beta_{\Delta 1}\right)\cdot Z_{zx}^{R2} +$$
$$\cos\theta_T\sin\theta_{R1}\sin\left(\frac{n}{m}\cdot 360° + \beta_{off} + \beta_{\Delta 1}\right)\cdot Z_{zy}^{R2} +$$
$$\cos\theta_T\cos\left(\frac{n}{m}\cdot 360° + \beta_{off} + \beta_{\Delta 1}\right)\cdot Z_{zz}^{R2}$$

$$V_2(n) = \sin\theta_T\cos\beta_T\sin\theta_{R2}\cos\left(\frac{n}{m}\cdot 360° + \beta_{off}\right)\cdot Z_{xx}^{R2} +$$
$$\sin\theta_T\cos\beta_T\sin\theta_{R2}\sin\left(\frac{n}{m}\cdot 360° + \beta_{off}\right)\cdot Z_{xy}^{R2} +$$
$$\sin\theta_T\cos\beta_T\cos\left(\frac{n}{m}\cdot 360° + \beta_{off}\right)\cdot Z_{xz}^{R2} +$$
$$\sin\theta_T\sin\beta_T\sin\theta_{R2}\cos\left(\frac{n}{m}\cdot 360° + \beta_{off}\right)\cdot Z_{yx}^{R2} +$$
$$\sin\theta_T\sin\beta_T\sin\theta_{R1}\sin\left(\frac{n}{m}\cdot 360° + \beta_{off}\right)\cdot Z_{yy}^{R22} +$$
$$\sin\theta_T\sin\beta_T\cos\left(\frac{n}{m}\cdot 360° + \beta_{0ff}\right)\cdot Z_{yz}^{R2} + \cos\theta_T\sin\theta_{R2}\cos\beta_{R2}\cdot Z_{zx}^{R2} +$$
$$\cos\theta_T\sin\theta_{R2}\sin\left(\frac{n}{m}\cdot 360° + \beta_{off}\right)\cdot Z_{zy}^{R2} + \cos\theta_T\cos\left(\frac{n}{m}\cdot 360° + \beta_{off}\right)\cdot Z_{zz}^{R2}$$

$$V_3(n) = \sin\theta_T\cos\beta_T\sin\theta_{R3}\cos\left(\frac{n}{m}\cdot 360° + \beta_{off} + \beta_{\Delta 2}\right)\cdot Z_{xx}^{R2} +$$
$$\sin\theta_T\cos\beta_T\sin\theta_{R3}\sin\left(\frac{n}{m}\cdot 360° + \beta_{off} + \beta_{\Delta 2}\right)\cdot Z_{xy}^{R2} +$$
$$\sin\theta_T\cos\beta_T\cos\left(\frac{n}{m}\cdot 360° + \beta_{off} + \beta_{\Delta 2}\right)\cdot Z_{xz}^{R2} +$$
$$\sin\theta_T\sin\beta_T\sin\theta_{R3}\cos\left(\frac{n}{m}\cdot 360° + \beta_{off} + \beta_{\Delta 2}\right)\cdot Z_{yx}^{R2} +$$
$$\sin\theta_T\sin\beta_T\sin\theta_{R3}\sin\left(\frac{n}{m}\cdot 360° + \beta_{off} + \beta_{\Delta 2}\right)\cdot Z_{yy}^{R2} +$$
$$\sin\theta_T\sin\beta_T\cos\left(\frac{n}{m}\cdot 360° + \beta_{off} + \beta_{\Delta 2}\right)\cdot Z_{yz}^{R2} +$$
$$\cos\theta_T\sin\theta_{R3}\cos\left(\frac{n}{m}\cdot 360° + \beta_{off} + \beta_{\Delta 2}\right)\cdot Z_{zx}^{R2} +$$
$$\cos\theta_T\sin\theta_{R3}\sin\left(\frac{n}{m}\cdot 360° + \beta_{off} + \beta_{\Delta 2}\right)\cdot Z_{zy}^{R2} +$$
$$\cos\theta_T\cos\left(\frac{n}{m}\cdot 360° + \beta_{off} + \beta_{\Delta 2}\right)\cdot Z_{zz}^{R2}$$

where $V_1(n)$ is the first response signal with respect to index n, $V_2(n)$ is the second response signal with respect to index n, and $V_3(n)$ is the third response signal with respect to index n.

5. The method of claim 4 wherein each of the response signals with respect to n is:

$$\begin{bmatrix} V_1(n=1) \\ V_2(n=1) \\ V_3(n=1) \\ \vdots \\ V_1(n=m) \\ V_2(n=m) \\ V_3(n=m) \end{bmatrix} = \overline{\overline{B}}_{m \times 9} \cdot \begin{bmatrix} Z_{xx}^{R2} \\ Z_{xy}^{R2} \\ Z_{xz}^{R2} \\ Z_{yx}^{R2} \\ Z_{yy}^{R2} \\ Z_{yz}^{R2} \\ Z_{zx}^{R2} \\ Z_{zy}^{R2} \\ Z_{zz}^{R2} \end{bmatrix}$$

where $\overline{\overline{B}}_{m \times 9}$ is an m by 9 matrix comprising coefficients from each of the response signals with respect to n for the first response signal, the second response signal, and the third response signal from n to m.

6. The method of claim 5 wherein the step solving the series of linear equations comprises solving for a vector defined as:

$$\begin{bmatrix} Z_{xx}^{R2} \\ Z_{xy}^{R2} \\ Z_{xz}^{R2} \\ Z_{yx}^{R2} \\ Z_{yy}^{R2} \\ Z_{yz}^{R2} \\ Z_{zx}^{R2} \\ Z_{zy}^{R2} \\ Z_{zz}^{R2} \end{bmatrix}.$$

7. The method of claim 6 wherein the vector is solved for using least square matrix inversion using a Hermitian operator such that:

$$\begin{bmatrix} Z_{xx}^{R2} \\ Z_{xy}^{R2} \\ Z_{xz}^{R2} \\ Z_{yx}^{R2} \\ Z_{yy}^{R2} \\ Z_{yz}^{R2} \\ Z_{zx}^{R2} \\ Z_{zy}^{R2} \\ Z_{zz}^{R2} \end{bmatrix} = \left( \overline{\overline{B}}_{m \times 9}^{H} = \overline{\overline{B}}_{m \times 9} \right)^{-1} \cdot \overline{\overline{B}}_{m \times 9}^{H} \cdot \begin{bmatrix} V_1(n=1) \\ V_2(n=1) \\ V_3(n=1) \\ \vdots \\ V_1(n=m) \\ V_2(n=m) \\ V_3(n=m) \end{bmatrix}$$

where H is the Hermitian operator.

8. The method of claim 7 wherein the vector is solved for using least square matrix inversion using a Hermitian operator and Tikhonov regularization is applied such that:

$$\begin{bmatrix} Z_{xx}^{R2} \\ Z_{xy}^{R2} \\ Z_{xz}^{R2} \\ Z_{yx}^{R2} \\ Z_{yy}^{R2} \\ Z_{yz}^{R2} \\ Z_{zx}^{R2} \\ Z_{zy}^{R2} \\ Z_{zz}^{R2} \end{bmatrix} = \left( \overline{\overline{B}}_{m \times 9}^{H} = \overline{\overline{B}}_{m \times 9} + \lambda \overline{\overline{I}} \right)^{-1} \cdot \overline{\overline{B}}_{m \times 9}^{H} \cdot \begin{bmatrix} V_1(n=1) \\ V_2(n=1) \\ V_3(n=1) \\ \vdots \\ V_1(n=m) \\ V_2(n=m) \\ V_3(n=m) \end{bmatrix}$$

where $\lambda$ is a regularization factor.

9. The method of claim 8 wherein $\lambda$ is determined by an L-curve method.

10. An apparatus comprising:
a wellbore drill bit
a transmitter sub comprising a transmitter coil;
a first receiver sub comprising a first receiver coil;
a second receiver sub comprising a second receiver coil; and
a third receiver sub comprising a third receiver coil;
wherein the transmitter sub is configured to generate an electromagnetic wave at the transmitter coil and propagate the electromagnetic wave through a subterranean formation, wherein the first receiver coil is configured to receive the electromagnetic wave and generate a first response signal, wherein the second receiver coil is configured to receive the electromagnetic wave and generate a second response signal, and wherein the third receiver coil is configured to receive the electromagnetic wave and generate a third response signal;
at least one processor; and
a memory coupled to the processor to provide software that configures the processor to solve a series of linear equations defined by an orientation of the transmitter sub in the wellbore, an orientation of the first receiver coil, an orientation of the second receiver coil, and an orientation the third receiver coil, and each of the first response signal, the second response signal, and the third response signal to determine a Green's response tensor
wherein the series of linear equations has the following form for a response signal corresponding to each receiver, the response signal being the first response signal, the second response signal, or the third response signal;
for the first receiver:
$V_1(\theta_T, \beta_T, \theta_{R1}, \beta_{R1}) = \sin \theta_T \cos \beta_T \sin \theta_{R1} \cos \beta_{R1} \cdot Z_{xx}^{R1} + \sin \theta_T \cos \beta_T \sin \theta_{R1} \sin \beta_{R1} \cdot Z_{xy}^{R1} + \sin \theta_T \cos \beta_T \cos \beta_{R1} \cdot Z_{xz}^{R1} + \sin \theta_T \sin \beta_T \sin \theta_{R1} \cos \beta_{R1} \cdot Z_{yx}^{R1} + \sin \theta_T \sin \beta_T \sin \theta_{R1} \sin \beta_{R1} \cdot Z_{yy}^{R1} + \sin \theta_T \sin \beta_T \cos \beta_{R1} \cdot Z_{yz}^{R1} + \cos \theta_T \sin \theta_{R1} \cos \beta_{R1} \cdot Z_{zx}^{R1} + \cos \theta_T \sin \theta_{R1} \sin \beta_{R1} \cdot Z_{zy}^{R1} + \cos \theta_T \cos \beta_{R1} \cdot Z_{zz}^{R1}$
where $v_1(\theta_T, \beta_T, \theta_{R1}, \beta_{R1})$ is the first response signal, $\theta_T$ is a tilt angle of the transmitter coil, $\beta_T$ is an azimuth angle of the transmitter coil, $Z_{xx}^{R1}$ a component of the first response signal oriented in an X firection caused by the transmitter coil in the X direction, $Z_{xy}^{R1}$ a component of the first response signal oriented in a Y direction caused by the transmitter coil in the X direction, $Z_{xz}^{R1}$ a component of the first response signal oriented in a Z direction caused by the transmitter coil in the X direction, $Z_{yx}^{R1}$ a component of the first response signal oriented in the X direction caused by the transmitter coil in the Y direction, $Z_{yy}^{R1}$ a component of the first response signal oriented in the Y direction caused by the transmitter coil in the Y direction, $Z_{yz}^{R1}$ a component of the first response signal oriented in the Z direction caused by the transmitter coil in the Y direction, $Z_{zx}^{R1}$ a component of the first response signal oriented in the X direction caused by the transmitter coil in the Z direction, $Z_{zy}^{R1}$ a component of the first response signal oriented in the Y direction caused by the transmitter coil in the Z direction, $Z_{zz}^{R1}$ a component of the first response signal oriented in the Z direction caused by the transmitter coil in the Z direction, $\theta_{R1}$ is a tilt angle of the first receiver coil, and $\beta_{R1}$ is an azimuth angle of the receiver coil;

for the second receiver coil:

$V_2(\theta_T,\beta_T,\theta_{R2},\beta_{R2}) = \sin\theta_T \cos\beta_T \sin\theta_{R2}\cos\beta_{R2}\cdot Z_{xx}^{R2} + \sin\theta_T\cos\beta_T\sin\theta_{R2}\sin\beta_{R2}\cdot Z_{xy}^{R2} + \sin\theta_T\cos\beta_T\cos\beta_{R2}\cdot Z_{xz}^{R2} + \sin\theta_T\sin\beta_T\sin\theta_{R2}\cos\beta_{R2}\cdot Z_{yx}^{R2} + \sin\theta_T\sin\beta_T\sin\theta_{R1}\sin\beta_{R2}\cdot Z_{yy}^{R22} + \sin\theta_T\sin\beta_T\cos\beta_{R2}\cdot Z_{yz}^{R2} + \cos\theta_T\sin\theta_{R2}\cos\beta_{R2}\cdot Z_{zx}^{R2} + \cos\theta_T\sin\theta_{R2}\sin\beta_{R2}\cdot Z_{zy}^{R2} + \cos\theta_T\cos\beta_{R2}\cdot Z_{zz}^{R2}$ where $V_2(\theta_T, \beta_T, \theta_{R2}, \beta_2)$ is the second response signal, $\theta_T$ is the tilt angle of the transmitter coil, $\beta_T$ is the azimuth angle of the transmitter coil, $Z_{xx}^{R2}$ is a component of the second response signal oriented in the X direction caused by the transmitter coil in the X direction, $Z_{xy}^{R2}$ is a component of the second response signal oriented in the Y direction caused by the transmitter coil in the X direction, $Z_{xz}^{R2}$ is a component of the second response signal oriented in the Z direction caused by the transmitter coil in the X direction, $Z_{zx}^{R2}$ is a component of the second response signal oriented in the X direction caused by the transmitter coil in the Y direction, $Z_{yy}^{R2}$ is a component of the second response signal oriented in the Y direction caused by the transmitter coil in the Y direction, $Z_{yz}^{R2}$ is a component of the second response signal oriented in the Z direction caused by the transmitter coil in the Y direction, $Z_{zz}^{R2}$ is a component of the second response signal oriented in the X direction caused by the transmitter coil in the Z direction, $Z_{zx}^{R2}$ is a component of the second response signal oriented in the Y direction caused by the transmitter coil in the Z direction, $Z_{zz}^{R2}$ is a component of the second response signal oriented in the Z direction caused by the transmitter coil in the Z direction, $\theta_{R2}$ is a tilt angle of the second receiver coil, and $\Delta_{R2}$ is an azimuth angle of the second receiver coil;

for the third receiver:

$V_3(\theta_T,\beta_T,\theta_{R3},\beta_{R1}) = \sin\theta_T\cos\beta_T\sin\theta_{R3}\cos\beta_{R3}\cdot Z_{xx}^{R3} + \sin\theta_T\cos\beta_T\sin\theta_{R3}\sin\beta_{R3}\cdot Z_{xy}^{R3} + \sin\theta_T\cos\beta_T\cos\beta_{R3}\cdot Z_{xz}^{R3} + \sin\theta_T\sin\beta_T\sin\theta_{R3}\cos\beta_{R3}\cdot Z_{yx}^{R3} + \sin\theta_T\sin\beta_T\sin\theta_{R3}\sin\beta_{R3}\cdot Z_{yy}^{R3} + \sin\theta_T\sin\beta_T\cos\beta_{R3}\cdot Z_{yz}^{R3} + \cos\theta_T\sin\theta_{R3}\cos\beta_{R3}\cdot Z_{zx}^{R3} + \cos\theta_T\sin\theta_{R3}\sin\beta_{R3}\cdot Z_{zy}^{R3} + \cos\theta_T\cos\beta_{R3}\cdot Z_{zz}^{R3}$ where $v_3(\theta_T, \beta_T, \theta R_3, \beta_R O)$ is the third response signal, $\theta_T$ is the tilt angle of the transmitter coil, $\beta_T$ is the azimuth angle of the transmitter coil, $Z_{xy}^{R3}$ is a component of the third response signal oriented in the X direction caused by the transmitter coil in the X direction, $Z_{xy}^{R3}$ is a component of the third response signal oriented in the Y direction caused by the transmitter coil in the X direction, $Z_{xz}^{R3}$ is a component of the third response signal oriented in the Z direction caused by the transmitter coil in the X direction, $Z_{yx}^{R3}$ is a component of the third response signal oriented in the X direction caused by the transmitter coil in the Y direction, $Z_{yy}^{R3}$ is a component of the third response signal oriented in the Y direction caused by the transmitter coil in the Y direction, $Z_{yz}^{R3}$ is a component of the third response signal oriented in the Z direction caused by the transmitter coil in the Y direction, $Z_{xx}^{R3}$ is a component of the third response signal oriented in the X direction caused by the transmitter coil in the Z direction, $Z_{zx}^{R3}$ is a component of the third response signal oriented in the Y direction caused by the transmitter coil in the Z direction, $Z_{zz}^{R3}$ is a component of the third response signal oriented in the Z direction caused by the transmitter coil in the Z direction, $\theta_{R3}$ is a tilt angle of the receiver coil, and $\beta_{R3}$ is an azimuth angle of the third receiver coil.

11. The apparatus of claim 10 wherein each azimuth angle is found by the following equations:
azimuth angle of the transmitter coil:

$$\beta_T = \frac{n}{m} \cdot 360°$$

where $\beta_T$ is the azimuth angle of the transmitter coil, m is a number of times the first receiver coil samples per turn of the apparatus in the wellbore, and n is an index from 1 to m;
azimuth angle of the first receiver coil:

$$\beta_{R1} = \beta_T + \beta_{off} + \beta_{\Delta 1}$$

where $\beta_{R1}$ is the azimuth angle of the first receiver coil, $\beta_{off}$ is the difference in azimuthal angle between the transmitter coil and the second receiver coil, $\beta_{\Delta 1}$ is the difference in azimuthal angle between the first receiver coil and the second receiver coil,
azimuth angle of the second receiver:

$$\beta_{R3} = \beta_T + \beta_{off} + \beta_{\Delta 2}$$

where $\beta_{R2}$ is the azimuth angle of the second receiver coil,
azimuth angle of the third receiver coil:

$$\beta_{R3} = \beta_T + \beta_{off} + \beta_{\Delta 2}$$

where $\beta_{R2}$ is the azimuth angle of the second receiver coil and $\beta_{\Delta 2}$ the difference in azimuthal angle between the second receiver coil and third receiver coil,
and wherein an assumption of $Z_{..}^{R1} \approx Z_{..}^{R2} \approx Z_{..}^{R3}$ is applied to each response signal equation such that:

$$V_1(n) = \sin\theta_T \cos\beta_T \sin\theta_{R1} \cos\left(\frac{n}{m}\cdot 360° + \beta_{off} + \beta_{\Delta 1}\right)\cdot Z_{xx}^{R2} +$$
$$\sin\theta_T \cos\beta_T \sin\theta_{R1} \sin\left(\frac{n}{m}\cdot 360° + \beta_{off} + \beta_{\Delta 1}\right)\cdot Z_{xy}^{R2} +$$
$$\sin\theta_T \cos\beta_T \cos\left(\frac{n}{m}\cdot 360° + \beta_{off} + \beta_{\Delta 1}\right)\cdot Z_{xz}^{R2} +$$
$$\sin\theta_T \sin\beta_T \sin\theta_{R1} \cos\left(\frac{n}{m}\cdot 360° + \beta_{off} + \beta_{\Delta 1}\right)\cdot Z_{yx}^{R2} +$$
$$\sin\theta_T \sin\beta_T \sin\theta_{R1} \sin\beta_{R1} \cdot Z_{yy}^{R2} +$$
$$\sin\theta_T \sin\beta_T \cos\left(\frac{n}{m}\cdot 360° + \beta_{off} + \beta_{\Delta 1}\right)\cdot Z_{yz}^{R2} +$$
$$\cos\theta_T \sin\theta_{R1} \cos\left(\frac{n}{m}\cdot 360° + \beta_{off} + \beta_{\Delta 1}\right)\cdot Z_{zx}^{R2} +$$
$$\cos\theta_T \sin\theta_{R1} \sin\left(\frac{n}{m}\cdot 360° + \beta_{off} + \beta_{\Delta 1}\right)\cdot Z_{zy}^{R2} +$$
$$\cos\theta_T \cos\left(\frac{n}{m}\cdot 360° + \beta_{off} + \beta_{\Delta 1}\right)\cdot Z_{zz}^{R2}$$

$$V_2(n) = \sin\theta_T \cos\beta_T \sin\theta_{R2} \cos\left(\frac{n}{m}\cdot 360° + \beta_{off}\right)\cdot Z_{xx}^{R2} +$$
$$\sin\theta_T \cos\beta_T \sin\theta_{R2} \sin\left(\frac{n}{m}\cdot 360° + \beta_{off}\right)\cdot Z_{xy}^{R2} +$$
$$\sin\theta_T \cos\beta_T \cos\left(\frac{n}{m}\cdot 360° + \beta_{off}\right)\cdot Z_{xz}^{R2} +$$
$$\sin\theta_T \sin\beta_T \sin\theta_{R2} \cos\left(\frac{n}{m}\cdot 360° + \beta_{off}\right)\cdot Z_{yx}^{R2} +$$
$$\sin\theta_T \sin\beta_T \sin\theta_{R1} \sin\left(\frac{n}{m}\cdot 360° + \beta_{off}\right)\cdot Z_{yy}^{R22} +$$
$$\sin\theta_T \sin\beta_T \cos\left(\frac{n}{m}\cdot 360° + \beta_{off}\right)\cdot Z_{yz}^{R2} + \cos\theta_T \sin\theta_{R2} \cos\beta_{R2}\cdot Z_{zx}^{R2} +$$

-continued $$\cos\theta_T \sin\theta_{R2} \sin\left(\frac{n}{m} \cdot 360° + \beta_{off}\right) \cdot Z_{zy}^{R2} +$$

$$\cos\theta_T \cos\left(\frac{n}{m} \cdot 360° + \beta_{off}\right) \cdot Z_{zz}^{R2}$$

$$V_3(n) = \sin\theta_T \cos\beta_T \sin\theta_{R3} \cos\left(\frac{n}{m} \cdot 360° + \beta_{off} + \beta_{\Delta 2}\right) \cdot Z_{xx}^{R2} +$$

$$\sin\theta_T \cos\beta_T \sin\theta_{R3} \sin\left(\frac{n}{m} \cdot 360° + \beta_{off} + \beta_{\Delta 2}\right) \cdot Z_{xy}^{R2} +$$

$$\sin\theta_T \cos\beta_T \cos\left(\frac{n}{m} \cdot 360° + \beta_{off} + \beta_{\Delta 2}\right) \cdot Z_{xz}^{R2} +$$

$$\sin\theta_T \sin\beta_T \sin\theta_{R3} \cos\left(\frac{n}{m} \cdot 360° + \beta_{off} + \beta_{\Delta 2}\right) \cdot Z_{yx}^{R2} +$$

$$\sin\theta_T \sin\beta_T \sin\theta_{R3} \sin\left(\frac{n}{m} \cdot 360° + \beta_{off} + \beta_{\Delta 2}\right) \cdot Z_{yy}^{R2} +$$

$$\sin\theta_T \sin\beta_T \cos\left(\frac{n}{m} \cdot 360° + \beta_{off} + \beta_{\Delta 2}\right) \cdot Z_{yz}^{R2} +$$

$$\cos\theta_T \sin\theta_{R3} \cos\left(\frac{n}{m} \cdot 360° + \beta_{off} + \beta_{\Delta 2}\right) \cdot Z_{zx}^{R2} +$$

$$\cos\theta_T \sin\theta_{R3} \sin\left(\frac{n}{m} \cdot 360° + \beta_{off} + \beta_{\Delta 2}\right) Z_{zy}^{R2} +$$

$$\cos\theta_T \cos\left(\frac{n}{m} \cdot 360° + \beta_{off} + \beta_{\Delta 2}\right) \cdot Z_{zz}^{R2}$$

where $V_1(n)$ is the first response signal with respect to index n, $V_2(n)$ is the second response signal with respect to index n, and $V_3(n)$ is the third response signal with respect to index n.

12. The apparatus of claim 11 wherein each response signal with respect to n is:

$$\begin{bmatrix} V_1(n=1) \\ V_2(n=1) \\ V_3(n=1) \\ \vdots \\ V_1(n=m) \\ V_2(n=m) \\ V_3(n=m) \end{bmatrix} = \overline{\overline{B}}_{m\times 9} \cdot \begin{bmatrix} Z_{xx}^{R2} \\ Z_{xy}^{R2} \\ Z_{xz}^{R2} \\ Z_{yx}^{R2} \\ Z_{yy}^{R2} \\ Z_{yz}^{R2} \\ Z_{zx}^{R2} \\ Z_{zy}^{R2} \\ Z_{zz}^{R2} \end{bmatrix}$$

where $\overline{B}_{m\times 9}$ is an m by 9 matrix comprising coefficients from each response signal with respect to n for the first receiver, the second receiver, and the third receiver from n to m, wherein the step solving the series of linear equations comprises solving for a vector defined as:

$$\begin{bmatrix} Z_{xx}^{R2} \\ Z_{xy}^{R2} \\ Z_{xz}^{R2} \\ Z_{yx}^{R2} \\ Z_{yy}^{R2} \\ Z_{yz}^{R2} \\ Z_{zx}^{R2} \\ Z_{zy}^{R2} \\ Z_{zz}^{R2} \end{bmatrix}.$$

and wherein the vector is solved for using least square matrix inversion using a Hermitian operator such that:

$$\begin{bmatrix} Z_{xx}^{R2} \\ Z_{xy}^{R2} \\ Z_{xz}^{R2} \\ Z_{yx}^{R2} \\ Z_{yy}^{R2} \\ Z_{yz}^{R2} \\ Z_{zx}^{R2} \\ Z_{zy}^{R2} \\ Z_{zz}^{R2} \end{bmatrix} = \left(\overline{\overline{B}}_{m\times 9}^{H} = \overline{\overline{B}}_{m\times 9}\right)^{-1} \cdot \overline{\overline{B}}_{m\times 9}^{H} \cdot \begin{bmatrix} V_1(n=1) \\ V_2(n=1) \\ V_3(n=1) \\ \vdots \\ V_1(n=m) \\ V_2(n=m) \\ V_3(n=m) \end{bmatrix}$$

where H is the Hermitian operator.

13. The apparatus of claim 11 wherein the vector is solved for using least square matrix inversion using a Hermitian operator and Tikhonov regularization is applied such that:

$$\begin{bmatrix} Z_{xx}^{R2} \\ Z_{xy}^{R2} \\ Z_{xz}^{R2} \\ Z_{yx}^{R2} \\ Z_{yy}^{R2} \\ Z_{yz}^{R2} \\ Z_{zx}^{R2} \\ Z_{zy}^{R2} \\ Z_{zz}^{R2} \end{bmatrix} = \left(\overline{\overline{B}}_{m\times 9}^{H} = \overline{\overline{B}}_{m\times 9} + \lambda \overline{\overline{I}}\right)^{-1} \cdot \overline{\overline{B}}_{m\times 9}^{H} \cdot \begin{bmatrix} V_1(n=1) \\ V_2(n=1) \\ V_3(n=1) \\ \vdots \\ V_1(n=m) \\ V_2(n=m) \\ V_3(n=m) \end{bmatrix}$$

where $\lambda$ is a regularization factor and wherein $\lambda$ is determined by an L-curve method.

14. A system comprising:
a tool comprising:
a transmitter sub comprising a transmitter coil;
a first receiver sub comprising a first receiver coil;
a second receiver sub comprising a second receiver coil; and
a third receiver sub comprising a third receiver coil;
wherein the transmitter sub is configured to generate an electromagnetic wave at the transmitter coil and propagate the electromagnetic wave through a subterranean formation, wherein the first receiver coil is configured to receive the electromagnetic wave and generate a first response signal, wherein the second receiver coil is configured to receive the electromagnetic wave and generate a second response signal, and wherein the third receiver coil is configured to receive the electromagnetic wave and generate a third response signal;
a conveyance electrically coupled to the tool; and
a surface processing unit comprising:
at least one processor; and
a memory coupled to the processor to provide software that configures the processor to solve a series of linear equations defined by an orientation of the transmitter sub, first receiver sub, second receiver sub, and third receiver sub orientation in the wellbore, and the first response signal, the second response signal, and the first response signal to determine a Green's response tensor wherein the series of linear equations has the following form for a response signal corresponding to each receiver, the response signal being the first response signal, the second response signal, or the third response signal;

for the first receiver coil:

$V_1(\theta_T,\beta_T,\theta_{R1},\beta_{R1}) = \sin\theta_T\cos\beta_T\sin\theta_{R1}\cos\beta_{R1}\cdot Z_{xx}^{R1} + \sin\theta_T\cos\beta_T\sin\theta_{R1}\sin\beta_{R1}\cdot Z_{xy}^{R1} + \sin\theta_T\cos\beta_T\cos\beta_{R1}\cdot Z_{xz}^{R1} + \sin\theta_T\sin\beta_T\sin\theta_{R1}\cos\beta_{R1}\cdot Z_{yx}^{R1} + \sin\theta_T\sin\beta_T\sin\theta_{R1}\sin\beta_{R1}\cdot Z_{yy}^{R1} + \sin\theta_T\sin\beta_T\cos\beta_{R1}\cdot Z_{yz}^{R1} + \cos\theta_T\sin\theta_{R1}\cos\beta_{R1}\cdot Z_{zx}^{R1} + \cos\theta_T\sin\theta_{R1}\sin\beta_{R1}\cdot Z_{zy}^{R1} + \cos\theta_T\cos\beta_{R1}\cdot Z_{zz}^{R1}$ where $V_1(\theta_t, \Delta_t, \theta_{R1}, \beta_{R1})$ is the first response signal, $\theta_T$ is a tilt angle of the transmitter coil, $\beta_T$ is an azimuth angle of the transmitter coil, $Z_{xx}^{R1}$ is a component of the first response signal oriented in an X direction caused by the transmitter coil in the X direction, $Z_{xy}^{R1}$ is a component of the first response signal oriented in a Y direction caused by the transmitter coil in the X direction, $Z_{xz}^{R1}$ is a component of the first response signal oriented in a Z direction caused by the transmitter coil in the X direction, $Z_{yx}^{R1}$ is a component of the first response signal oriented in the X direction caused by the transmitter coil in the Y direction, $Z_{yy}^{R1}$ is a component of the first response signal oriented in the Y direction caused by the transmitter coil in the Y direction, $Z_{yz}^{R1}$ is a component of the first response signal oriented in the Z direction caused by the transmitter coil in the Y direction, $Z_{zx}^{R1}$ is a component of the first response signal oriented in the X direction caused by the transmitter coil in the Z direction, $Z_{zy}^{R1}$ is a component of the first response signal oriented in the Y direction caused by the transmitter coil in the Z direction, $Z_{zz}^{R1}$ is a component of the first response signal oriented in the Z direction caused by the transmitter coil in the Z direction, $\theta_{R1}$ is a tilt angle of the first receiver coil, and $\beta_{R1}$ is an azimuth angle of the receiver coil;

for the second receiver coil:

$V_2(\theta_T,\beta_T,\theta_{R2},\beta_{R2}) = \sin\theta_T\cos\beta_T\sin\theta_{R2}\cos\beta_{R2}\cdot Z_{xx}^{R2} + \sin\theta_T\cos\beta_T\sin\theta_{R2}\sin\beta_{R2}\cdot Z_{xy}^{R2} + \sin\theta_T\cos\beta_T\cos\beta_{R2}\cdot Z_{xz}^{R2} + \sin\theta_T\sin\beta_T\sin\theta_{R2}\cos\beta_{R2}\cdot Z_{yx}^{R2} + \sin\theta_T\sin\beta_T\sin\theta_{R1}\sin\beta_{R2}\cdot Z_{yy}^{R22} + \sin\theta_T\sin\beta_T\cos\beta_{R2}\cdot Z_{yz}^{R2} + \cos\theta_T\sin\theta_{R2}\cos\beta_{R2}\cdot Z_{zx}^{R2} + \cos\theta_T\sin\theta_{R2}\sin\beta_{R2}\cdot Z_{zy}^{R2} + \cos\theta_T\cos\beta_{R2}\cdot Z_{zz}^{R2}$ where $V_2(\theta_T, \beta_T, \theta_{R2}, \beta_{R2})$ is the second response signal, $\theta_T$ is the tilt angle of the transmitter coil, $\beta_T$ is the azimuth angle of the transmitter coil, $Z_{xx}^{R2}$ is a component of the second response signal oriented in the X direction caused by the transmitter coil in the X direction, $Z_{xy}^{R2}$ is a component of the second response signal oriented in the Y direction caused by the transmitter coil in the X direction, $Z_{xz}^{R2}$ is a component of the second response signal oriented in the Z direction caused by the transmitter coil in the X direction, $Z_{yx}^{R2}$ is a component of the second response signal oriented in the X direction caused by the transmitter coil in the Y direction, $Z_{yy}^{R2}$ is a component of the second response signal oriented in the Y direction caused by the transmitter coil in the Y direction, $Z_{yz}^{R2}$ is a component of the second response signal oriented in the Z direction caused by the transmitter coil in the Y direction, $Z_{zx}^{R2}$ is a component of the second response signal oriented in the X direction caused by the transmitter coil in the Z direction, $Z_{zy}^{R2}$ is a component of the second response signal oriented in the Y direction caused by the transmitter coil in the Z direction, $Z_{zz}^{R2}$ is a component of the second response signal oriented in the Z direction caused by the transmitter coil in the Z direction, $\theta_{R2}$ is a tilt angle of the second receiver coil, and $\beta_{R2}$ is an azimuth angle of the second receiver coil;

for the third receiver:

$V_3(\theta_T,\beta_T,\theta_{R3},\beta_{R1}) = \sin\theta_T\cos\beta_T\sin\theta_{R3}\cos\beta_{R3}\cdot Z_{xx}^{R3} + \sin\theta_T\cos\beta_T\sin\theta_{R3}\sin\beta_{R3}\cdot Z_{xy}^{R3} + \sin\theta_T\cos\beta_T\cos\beta_{R3}\cdot Z_{xz}^{R3} + \sin\theta_T\sin\beta_T\sin\theta_{R3}\cos\beta_{R3}\cdot Z_{yx}^{R3} + \sin\theta_T\sin\beta_T\sin\theta_{R3}\sin\beta_{R3}\cdot Z_{yy}^{R3} + \sin\theta_T\sin\beta_T\cos\beta_{R3}\cdot Z_{yz}^{R3} + \cos\theta_T\sin\theta_{R3}\cos\beta_{R3}\cdot Z_{zx}^{R3} + \cos\theta_T\sin\theta_{R3}\sin\beta_{R3}\cdot Z_{zy}^{R3} + \cos\theta_T\cos\beta_{R3}\cdot Z_{zz}^{R3}$ where $v_3(\theta_T, \beta_T, \theta_{R3}, \beta_R)$ is the third response signal, $\theta_T$ is the tilt angle of the transmitter coil, $\beta_T$ is the azimuth angle of the transmitter coil, $Z_{xx}^{R3}$ is a component of the third response signal oriented in the X direction caused by the transmitter coil in the X direction, $Z_{xy}^{R3}$ is a component of the third response signal oriented in the Y direction caused by the transmitter coil in the X direction, $Z_{xz}^{R3}$ is a component of the third response signal oriented in the Z direction caused by the transmitter coil in the X direction, $Z_{yx}^{R3}$ is a component of the third response signal oriented in the X direction caused by the transmitter coil in the Y direction, $Z_{yy}^{R3}$ is a component of the third response signal oriented in the Y direction caused by the transmitter coil in the Y direction, $Z_{yz}^{R3}$ is a component of the third response signal oriented in the Z direction caused by the transmitter coil in the Y direction, $Z_{zx}^{R3}$ is a component of the third response signal oriented in the X direction caused by the transmitter coil in the Z direction, $Z_{zy}^{R3}$ is a component of the third response signal oriented in the Y direction caused by the transmitter coil in the Z direction, $Z_{zz}^{R3}$ is a component of the third response signal oriented in the Z direction caused by the transmitter coil in the Z direction, $\theta_{R3}$ is a tilt angle of the receiver coil, and $\beta_{R3}$ is an azimuth angle of the third receiver coil.

15. The apparatus of claim 14 wherein each azimuth angle is found by the following equations:
azimuth angle of the transmitter coil:

$$\beta_T = \frac{n}{m} \cdot 360°$$

where $\beta_T$ is the azimuth angle of the transmitter coil, m is a number of times the receivers sample per turn of the apparatus in the wellbore, and n is an index from 1 to m;
azimuth angle of the transmitter coil:

$$\beta_T = \frac{n}{m} \cdot 360°$$

where $\beta_T$ is the azimuth angle of the transmitter coil, m is a number of times the first receiver coil samples per turn of the apparatus in the wellbore, and n is an index from 1 to m;
azimuth angle of the first receiver coil:

$\beta_{R1} = \beta_T + \beta_{off} + \beta_{\Delta 1}$ where $\beta_{R1}$ is the azimuth angle of the first receiver coil, $\beta_{off}$ is the difference in azimuthal angle between the transmitter coil and the second receiver coil, $\beta_{\Delta 1}$ is the difference in azimuthal angle between the first receiver coil and the second receiver coil,
azimuth angle of the second receiver:

$\beta_{R2} = \beta_T + \beta_{off}$ where $\beta_{R2}$ is the azimuth angle of the second receiver coil,
azimuth angle of the third receiver coil:

$\beta_{R2} = \beta_T + \beta_{off} + \beta_{\Delta 2}$ where $\beta_{R2}$ is the azimuth angle of the second receiver coil and $\beta_{\Delta 2}$ the difference in azimuthal angle between the second receiver coil and third receiver coil,
and wherein an assumption of $Z_{..}^{R1} \approx Z_{..}^{R2} \approx Z_{..}^{R3}$ is applied to each response signal equation such that:

$$V_1(n) = \sin\theta_T \cos\beta_T \sin\theta_{R1} \cos\left(\frac{n}{m} \cdot 360° + \beta_{off} + \beta_{\Delta 1}\right) \cdot Z_{xx}^{R2} +$$

$$\sin\theta_T \cos\beta_T \sin\theta_{R1} \sin\left(\frac{n}{m} \cdot 360° + \beta_{off} + \beta_{\Delta 1}\right) \cdot Z_{xy}^{R2} +$$

$$\sin\theta_T \cos\beta_T \cos\left(\frac{n}{m} \cdot 360° + \beta_{off} + \beta_{\Delta 1}\right) \cdot Z_{xz}^{R2} +$$

$$\sin\theta_T \sin\beta_T \sin\theta_{R1} \cos\left(\frac{n}{m} \cdot 360° + \beta_{off} + \beta_{\Delta 1}\right) \cdot Z_{yx}^{R2} +$$

$$\sin\theta_T \sin\beta_T \sin\theta_{R1} \sin\beta_{R1} \cdot Z_{yy}^{R2} +$$

$$\sin\theta_T \sin\beta_T \cos\left(\frac{n}{m} \cdot 360° + \beta_{off} + \beta_{\Delta 1}\right) \cdot Z_{yz}^{R2} +$$

$$\cos\theta_T \sin\theta_{R1} \cos\left(\frac{n}{m} \cdot 360° + \beta_{off} + \beta_{\Delta 1}\right) \cdot Z_{zx}^{R2} +$$

$$\cos\theta_T \sin\theta_{R1} \sin\left(\frac{n}{m} \cdot 360° + \beta_{off} + \beta_{\Delta 1}\right) \cdot Z_{zy}^{R2} +$$

$$\cos\theta_T \cos\left(\frac{n}{m} \cdot 360° + \beta_{off} + \beta_{\Delta 1}\right) \cdot Z_{zz}^{R2}$$

$$V_2(n) = \sin\theta_T \cos\beta_T \sin\theta_{R2} \cos\left(\frac{n}{m} \cdot 360° + \beta_{off}\right) \cdot Z_{xx}^{R2} +$$

$$\sin\theta_T \cos\beta_T \sin\theta_{R2} \sin\left(\frac{n}{m} \cdot 360° + \beta_{off}\right) \cdot Z_{xy}^{R2} +$$

$$\sin\theta_T \cos\beta_T \cos\left(\frac{n}{m} \cdot 360° + \beta_{off}\right) \cdot Z_{xz}^{R2} +$$

$$\sin\theta_T \sin\beta_T \sin\theta_{R2} \cos\left(\frac{n}{m} \cdot 360° + \beta_{off}\right) \cdot Z_{yx}^{R2} +$$

$$\sin\theta_T \sin\beta_T \sin\theta_{R1} \sin\left(\frac{n}{m} \cdot 360° + \beta_{off}\right) \cdot Z_{yy}^{R22} +$$

$$\sin\theta_T \sin\beta_T \cos\left(\frac{n}{m} \cdot 360° + \beta_{off}\right) \cdot Z_{yz}^{R2} + \cos\theta_T \sin\theta_{R2} \cos\beta_{R2} \cdot Z_{zx}^{R2} +$$

$$\cos\theta_T \sin\theta_{R2} \sin\left(\frac{n}{m} \cdot 360° + \beta_{off}\right) \cdot Z_{zy}^{R2} +$$

$$\cos\theta_T \cos\left(\frac{n}{m} \cdot 360° + \beta_{off}\right) \cdot Z_{zz}^{R2}$$

$$V_3(n) = \sin\theta_T \cos\beta_T \sin\theta_{R3} \cos\left(\frac{n}{m} \cdot 360° + \beta_{off} + \beta_{\Delta 2}\right) \cdot Z_{xx}^{R2} +$$

$$\sin\theta_T \cos\beta_T \sin\theta_{R3} \sin\left(\frac{n}{m} \cdot 360° + \beta_{off} + \beta_{\Delta 2}\right) \cdot Z_{xy}^{R2} +$$

$$\sin\theta_T \cos\beta_T \cos\left(\frac{n}{m} \cdot 360° + \beta_{off} + \beta_{\Delta 2}\right) \cdot Z_{xz}^{R2} +$$

$$\sin\theta_T \sin\beta_T \sin\theta_{R3} \cos\left(\frac{n}{m} \cdot 360° + \beta_{off} + \beta_{\Delta 2}\right) \cdot Z_{yx}^{R2} +$$

$$\sin\theta_T \sin\beta_T \sin\theta_{R3} \sin\left(\frac{n}{m} \cdot 360° + \beta_{off} + \beta_{\Delta 2}\right) \cdot Z_{yy}^{R2} +$$

$$\sin\theta_T \sin\beta_T \cos\left(\frac{n}{m} \cdot 360° + \beta_{off} + \beta_{\Delta 2}\right) \cdot Z_{yz}^{R2} +$$

$$\cos\theta_T \sin\theta_{R3} \cos\left(\frac{n}{m} \cdot 360° + \beta_{off} + \beta_{\Delta 2}\right) \cdot Z_{zx}^{R2} +$$

$$\cos\theta_T \sin\theta_{R3} \sin\left(\frac{n}{m} \cdot 360° + \beta_{off} + \beta_{\Delta 2}\right) Z_{zy}^{R2} +$$

$$\cos\theta_T \cos\left(\frac{n}{m} \cdot 360° + \beta_{off} + \beta_{\Delta 2}\right) \cdot Z_{zz}^{R2}$$

where $V_1(n)$ is the first response signal with respect to index n, $V_2(n)$ is the second response signal with respect to index n, and $V_3(n)$ is the third response signal with respect to index n.

16. The apparatus of claim 15 wherein each response signal with respect to n is:

$$\begin{bmatrix} V_1(n=1) \\ V_2(n=1) \\ V_3(n=1) \\ \vdots \\ V_1(n=m) \\ V_2(n=m) \\ V_3(n=m) \end{bmatrix} = \overline{\overline{B}}_{m \times 9} \cdot \begin{bmatrix} Z_{xx}^{R2} \\ Z_{xy}^{R2} \\ Z_{xz}^{R2} \\ Z_{yx}^{R2} \\ Z_{yy}^{R2} \\ Z_{yz}^{R2} \\ Z_{zx}^{R2} \\ Z_{zy}^{R2} \\ Z_{zz}^{R2} \end{bmatrix}$$

where $\overline{\overline{B}}_{m \times 9}$ is an m by 9 matrix comprising coefficients from each of the first response signal, second response signal, and third response signal with respect to index n to m, wherein the step solving the series of linear equations comprises solving for a vector defined as:

$$\begin{bmatrix} Z_{xx}^{R2} \\ Z_{xy}^{R2} \\ Z_{xz}^{R2} \\ Z_{yx}^{R2} \\ Z_{yy}^{R2} \\ Z_{yz}^{R2} \\ Z_{zx}^{R2} \\ Z_{zy}^{R2} \\ Z_{zz}^{R2} \end{bmatrix}$$

and wherein the vector is solved for using least square matrix inversion using a Hermitian operator such that:

$$\begin{bmatrix} Z_{xx}^{R2} \\ Z_{xy}^{R2} \\ Z_{xz}^{R2} \\ Z_{yx}^{R2} \\ Z_{yy}^{R2} \\ Z_{yz}^{R2} \\ Z_{zx}^{R2} \\ Z_{zy}^{R2} \\ Z_{zz}^{R2} \end{bmatrix} = \left(\overline{\overline{B}}_{m \times 9}^{H} = \overline{\overline{B}}_{m \times 9}\right)^{-1} \cdot \overline{\overline{B}}_{m \times 9}^{H} \cdot \begin{bmatrix} V_1(n=1) \\ V_2(n=1) \\ V_3(n=1) \\ \vdots \\ V_1(n=m) \\ V_2(n=m) \\ V_3(n=m) \end{bmatrix}$$

where H is the Hermitian operator.

17. The apparatus of claim 15 wherein the vector is solved for using least square matrix inversion using a Hermitian operator and Tikhonov regularization is applied such that:

$$\begin{bmatrix} Z_{xx}^{R2} \\ Z_{xy}^{R2} \\ Z_{xz}^{R2} \\ Z_{yx}^{R2} \\ Z_{yy}^{R2} \\ Z_{yz}^{R2} \\ Z_{zx}^{R2} \\ Z_{zy}^{R2} \\ Z_{zz}^{R2} \end{bmatrix} = \left( \overline{\overline{B}}_{m \times 9}^{H} = \overline{\overline{B}}_{m \times 9} + \lambda \overline{\overline{I}} \right)^{-1} \cdot \overline{\overline{B}}_{m \times 9}^{H} \cdot \begin{bmatrix} V_1(n=1) \\ V_2(n=1) \\ V_3(n=1) \\ \vdots \\ V_1(n=m) \\ V_2(n=m) \\ V_3(n=m) \end{bmatrix}$$

where $\lambda$ is a regularization factor and wherein $\lambda$ is determined by an L-curve method.

\* \* \* \* \*